United States Patent
Fujise et al.

(10) Patent No.: US 6,442,252 B1
(45) Date of Patent: Aug. 27, 2002

(54) COMMUNICATION APPARATUS

(75) Inventors: Shunichi Fujise, Abiko; Makoto Mikuni, Yokohama; Takahiro Kiyohara, Toride; Fumio Shoji, Abiko; Atsushi Ikeda, Tokorozawa; Naoya Watanabe, Toride, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/144,063

(22) Filed: Aug. 31, 1998

(30) Foreign Application Priority Data

| Sep. 5, 1997 | (JP) | ............................................ 9-257782 |
| Nov. 28, 1997 | (JP) | ............................................ 9-344307 |
| Dec. 10, 1997 | (JP) | ............................................ 9-340263 |

(51) Int. Cl.[7] .......................................... H04M 11/00
(52) U.S. Cl. ............................ 379/100.01; 379/100.05; 358/404; 358/440
(58) Field of Search ....................... 379/100.05, 100.06, 379/100.13, 100.01, 93.05; 358/405, 404, 440

(56) References Cited

U.S. PATENT DOCUMENTS

| 4,717,967 A | * | 1/1988 | Yoshida ....................... 358/296 |
| 4,772,955 A | | 9/1988 | Kurahayashi et al. ........ 358/257 |
| 4,843,479 A | | 6/1989 | Yoshino et al. .............. 358/257 |
| 4,845,569 A | | 7/1989 | Kurahayashi et al. ........ 358/400 |
| 4,849,816 A | | 7/1989 | Yoshida ....................... 358/434 |
| 4,916,607 A | | 4/1990 | Teraichi et al. .............. 364/200 |
| 5,130,818 A | * | 7/1992 | Tadokoro ..................... 358/407 |
| 5,189,696 A | | 2/1993 | Yoshida ....................... 379/355 |
| 5,216,517 A | * | 6/1993 | Kinoshita et al. ............ 358/400 |
| 5,239,385 A | | 8/1993 | Ejiri ............................ 358/434 |
| 5,251,254 A | | 10/1993 | Tanigawa et al. ............ 379/165 |
| 5,289,582 A | | 2/1994 | Hirata et al. ................. 395/275 |
| 5,291,549 A | | 3/1994 | Izumi .......................... 379/233 |
| 5,293,253 A | | 3/1994 | Kida et al. .................... 358/440 |
| 5,349,447 A | | 9/1994 | Kuwahara et al. ........... 358/404 |
| 5,379,124 A | * | 1/1995 | Ikegaya et al. .............. 358/440 |
| 5,406,387 A | * | 4/1995 | Yamamoto ................... 358/407 |
| 5,420,918 A | | 5/1995 | Tsuchida ..................... 379/352 |
| 5,473,691 A | * | 12/1995 | Menezes et al. ............. 358/440 |
| 5,519,508 A | | 5/1996 | Murayama ................... 358/436 |
| 5,703,698 A | | 12/1997 | Yoshida et al. .............. 358/435 |
| 5,742,402 A | * | 4/1998 | Kobayashi et al. .......... 358/404 |
| 5,960,068 A | * | 9/1999 | Yoshida et al. ......... 379/100.13 |
| 5,963,340 A | * | 10/1999 | Kim ............................ 358/404 |
| 5,978,097 A | * | 11/1999 | Ueno .......................... 358/407 |
| 6,118,551 A | * | 9/2000 | Park ............................ 358/405 |

FOREIGN PATENT DOCUMENTS

| EP | 0 159 158 A1 | 10/1985 |
| EP | 0 679 012 A3 | 10/1995 |
| EP | 0 679 012 A2 | 10/1995 |

* cited by examiner

Primary Examiner—Stella Woo
(74) Attorney, Agent, or Firm—Fitzpatrick, Cella, Harper & Scinto

(57) ABSTRACT

A communication apparatus includes a main unit and a communication control unit. The communication control unit informs the main unit of an incoming call. The main unit makes a judgement on whether the incoming call should be accepted. In accordance with this judgement, the main unit instructs the communication control unit to respond to the incoming call. The communication control unit responds to the incoming call in accordance with the judgement by the main unit. In accordance with the state of a memory for storing received signals or with the called party number, the main unit makes a judgement on whether the incoming call should be rejected or ignored.

21 Claims, 19 Drawing Sheets

COMMUNICATION APPARATUS

BACKGROUND OF THE INVENTION

1. Field of the Invention

The present invention relates to a communication apparatus.

2. Description of the Related Art

Conventional communication terminals always accept incoming calls to start communication in most cases.

If, however, a communication terminal is unable to accept communication, e.g., if a facsimile apparatus cannot accept facsimile reception because there is no printing sheet for facsimile reception, the apparatus sometimes rejects or ignores an incoming call.

Also, an incoming call signal transmitted through ISDN contains information such as a calling party number. By effectively using this information, a called communication terminal can make a judgement on whether the incoming call should be accepted or not.

Recently, to meet increased variations of communication lines and communication methods, a new product has been proposed by which only a communication control unit of a communication terminal is constructed and which functions as a communication terminal when the communication control unit is connected through an interface to a main unit (e.g., a copying machine) including an operation unit, a reading unit, a printing unit, a display unit, and the like.

With this product, variations of combinations of the communication control unit and the main unit can be increased by giving versatility to these units and the interface between them. This facilitates providing communication terminals meeting the needs of users.

When a communication terminal is constructed by connecting the communication control unit and the main unit through the interface as described above and a function of making a judgement on whether an incoming call should be responded to or not is imparted to the communication control unit, this communication terminal always accepts incoming calls regardless of the state of the main unit even if no incoming calls can be accepted due to the state of the main unit.

Additionally, it is difficult to prevent direct mails or select specific parties to be called, i.e., it is difficult to make a judgement in accordance with the setting by an operator such as a user on whether an incoming call should be responded to or not.

Also, the state of the main unit such as the presence/absence of printing sheets and the setting by the user can change every moment. However, it is difficult to easily make a judgement in accordance with these changes on whether an incoming call should be responded to or not.

Furthermore, to provide communication terminals meeting various needs of users, it is necessary to realize main units and communication control units, which achieve the above functions and meet the various needs, and interfaces for connecting these units.

When an incoming call arrives at an apparatus connected to an integrated digital communication network, the apparatus makes a judgement on whether the incoming call should be responded to or not in accordance with various factors, e.g., whether the state of the apparatus (e.g., the state of a memory or a printer) allows the call reception or whether the incoming call is a desired incoming call (called party number check). If the apparatus judges that it cannot respond to the incoming call, the apparatus rejects the incoming call (sends a release completion message: REL COMP) or ignores the incoming call (does not respond to the incoming call). The apparatus uniquely determines which operation is to be performed and performs the operation in accordance with the determination.

In the above conventional system, if a plurality of terminals are connected to one ISDN and an incoming call different from a called party number assigned to a certain terminal arrives at the terminal, the terminal judges that it cannot respond to this incoming call and either rejects or ignores the incoming call. Therefore, if the terminal is so set as to reject the incoming call, the possibility of call reception by a terminal by which the incoming call can be accepted is lost. In contrast, if the terminal is so set as to ignore the incoming call, the calling party cannot make a judgement on the reason why the called party does not respond (e.g., because the called part is performing communication or unable to accept the incoming call). Consequently, conditions convenient for the user cannot be set, and this results in inconvenience.

In conventional communication systems, a transmitting side adds secondary information as header information to data to be transmitted and transmits the data to a receiving side. The receiving side can recognize the character of the received data main body in accordance with the secondary information. Hence, the header information is exchanged as important information.

More specifically, when a personal computer is to transmit a certain data file, the computer forms the identification information of the file, e.g., the file name, file number, data type, data size, and file formation date, as the header information of the file and adds this identification information to the file main body.

Also, as shown in FIGS. 15 and 16, a facsimile apparatus adds header information to the leading edge of each page of an image to be transmitted and transmits the image to a partner facsimile apparatus. This header information contains, e.g., the transmission date, transmission time, calling party number, calling party abbreviation, destination abbreviation, page number, and total number of pages.

Since the header information is transmitted as a part of the image data to be transmitted, the header information is developed to have the same coding system and resolution as the image data and added to the head of an image data region. For example, character data corresponding to the header information is read out from a font ROM (Read-Only Memory) of the facsimile apparatus and developed to have the same coding system and resolution as the image data.

That is, when the image data is raw, the font data of the header information is developed into a raw image. When a facsimile coding method such as MH (Modified Huffman) is used, the font data is developed into codes of this coding method. Analogously, when a resolution of 8×3.85 pels/mm as one facsimile resolution is selected, the font data is developed in accordance with this resolution. The header data thus developed is connected as image data to the head of the image data to be transmitted to form final image data, and this final image data is transmitted.

To connect the header image to the head of the image data, the header image is overwritten on a few lines of the image data necessary for the header image, the image data to be transmitted is connected to the header image data and the image data is so reduced that the data can be printed on a fixed-size printing sheet on the receiving side, or a few lines of the image data necessary for the header image are deleted from the trailing edge of the image data.

Recently, to meet increased variations of communication lines and communication methods, a new product has been proposed by which a communication control unit for controlling communications of a communication apparatus is constructed as one functional part and which functions as a communication apparatus when the communication control unit is connected through an interface to a main unit including an operation unit, a reading unit, a printing unit, a display unit, and the like.

With this product, variations of combinations of the communication control unit and the main unit can be increased by clearly separating the communication control unit from the main unit and giving versatility to the interface between them. Consequently, various communication apparatuses meeting the needs of users can be easily provided.

When a communication terminal is constructed by connecting the communication control unit and the main unit through the interface as described above and a function of forming the header information is imparted to the communication control unit, the communication control unit must manage and input data for the header. This not only makes communication control cumbersome but also increases the cost and size of the communication control unit.

SUMMARY OF THE INVENTION

It is an object of the present invention to improve a call receiving operation of a communication apparatus constructed by connecting a main unit and a communication control unit.

It is another object of the present invention to accurately make a judgement on whether an incoming call should be responded to or not, without using any complicated arrangement, in a communication apparatus constructed by connecting a main unit and a communication control unit.

It is still another object of the present invention to make a judgement in accordance with a setting by an operator on whether an incoming call should be responded to or not, without using any complicated arrangement, in a communication apparatus constructed by connecting a main unit and a communication control unit.

It is still another object of the present invention to appropriately determine whether an incoming call should be rejected or ignored.

It is still another object of the present invention to improve an arrangement or procedure of adding additional information to transmission data and transmitting the data in a communication apparatus constructed by connecting a main unit and a communication control unit.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 1:
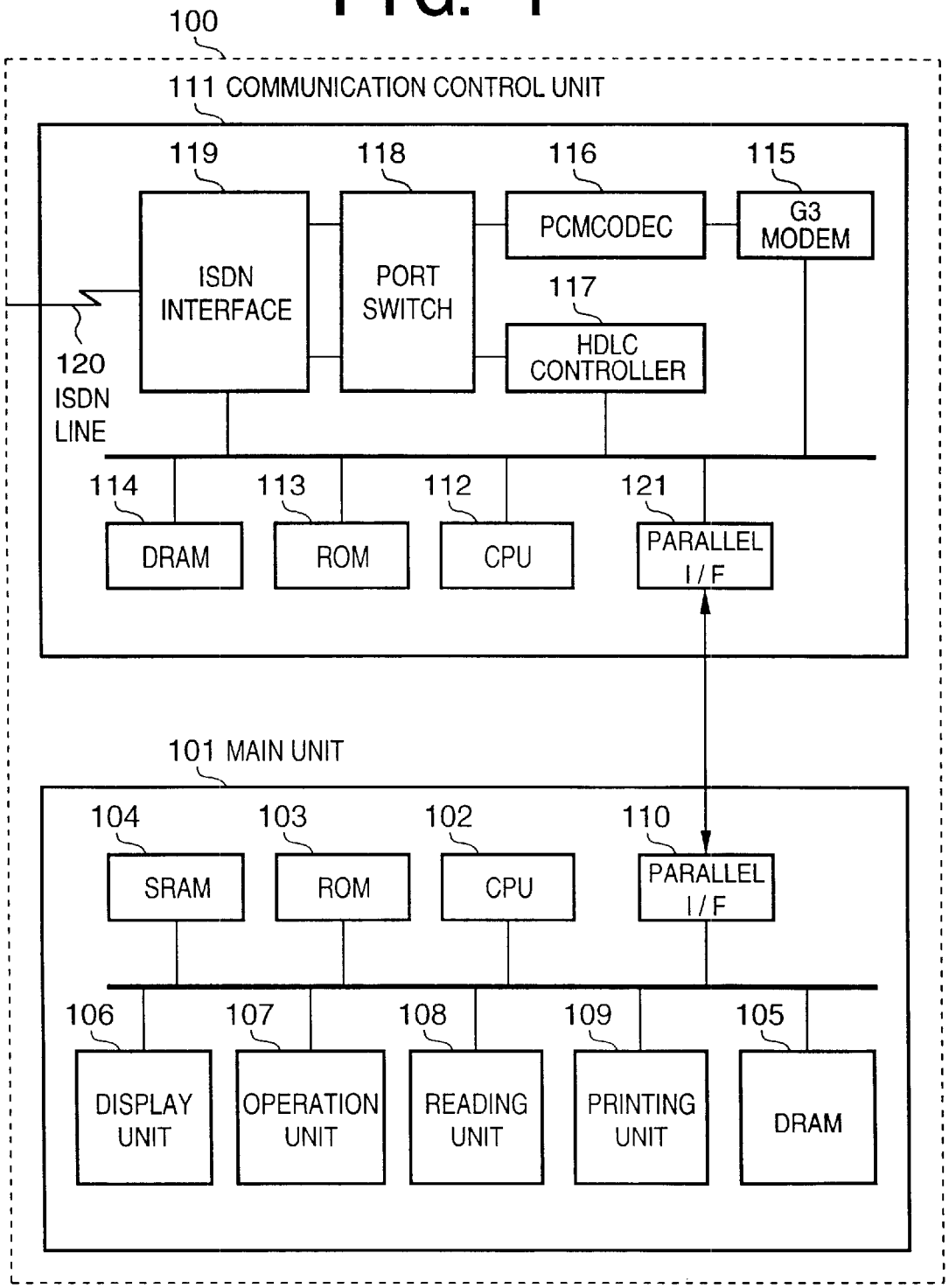
FIG. 1 is a block diagram showing the arrangement of a communication terminal according to an embodiment of the present invention.

FIG. 1 is a block diagram showing the arrangement of a communication apparatus (G3/G4 facsimile apparatus connected to ISDN) 100 according to an embodiment of the present invention.

As shown in FIG. 1, the communication apparatus 100 for communicating image data of this embodiment comprises a main unit 101 for controlling the whole apparatus and a communication control unit 111 for controlling communication functions.

The main unit 101 includes a CPU 102, a ROM 103, an SRAM 104, and a DRAM 105. The CPU 102 controls the individual components of the main unit. The ROM 103 stores control programs of the main unit 101. The SRAM 104 stores parameters and data required for the operations of the CPU 102 and the apparatus and is backed up by a secondary battery. The DRAM 105 stores image data to be facsimile-transmitted and facsimile-received image data.

The main unit 101 further includes a display unit 106, an operation unit 107, a reading unit 108, a printing unit 109, and a parallel interface (i/f) 110. The display unit 106 displays the state of the apparatus and also displays an image to be facsimile-transmitted or a facsimile-received image. The operation unit 107 is used by a user to operate the apparatus 100 and designate an operation of the apparatus 100. The reading unit 108 reads a facsimile transmission original or a copy original. The printing unit 109 prints out a facsimile original, a copy original, or a file original. The parallel i/f 110 is, e.g., Bi-centronics connected to the communication control unit 111 to exchange parameters and data necessary to control the communication control unit 111 or exchange image data to be facsimile-transmitted and facsimile-received image data.

The communication control unit 111 includes a CPU 112, a ROM 113, and a DRAM 114. The CPU 112 controls the individual components of the communication control unit. The ROM 113 stores control programs of the communication control unit 111. The DRAM 114 stores parameters and data required for the operations of the CPU 112 and the whole communication control unit and also stores image data to be facsimile-transmitted and facsimile-received image data.

The communication control unit 111 also includes a G3 modem 115, a PCM codec 116, an HDLC controller 117, and a port switch 118. The G3 modem 115 controls communication protocols, modulates and demodulates signals, and transmits and receives signals to perform G3 facsimile transmission/reception. The PCM codec 116 converts G3 analog signals to be transmitted into PCM codes and converts received PCM codes into analog signals. The HDLC controller 117 forms an HDLC frame for an ISDN D channel protocol or a G4 facsimile protocol. The port switch 118 selectively connects G3 facsimile communication or G4 facsimile communication to an ISDN interface 119.

The communication control unit 111 also includes the ISDN interface 119 and a parallel interface (i/f) 121. The ISDN interface 119 is connected to an ISDN line 120 to perform ISDN D channel control or B channel control. The parallel i/f 121 is, e.g., a Bi-centronics interface connected to the main unit 101 to exchange necessary parameters and data with the main unit 101 and exchange image data to be facsimile-transmitted and facsimile-received image data.

The facsimile apparatus of this embodiment is separated into the main unit 101 and the communication control unit 111 which are connected through the parallel i/fs 110 and 121 having versatility. Accordingly, the main unit 101 and the communication control unit 111 can also have versatility.

That is, the communication control unit 111 has a G3/G4 facsimile communicating function of connecting to ISDN. However, this communication control unit can also have only a G3 facsimile communicating function of connecting to PSTN (analog public network).

Also, to construct a communication terminal additionally having a telephone function, a communication control unit additionally having this telephone function need only be connected to the main unit 101.

To connect the main unit 101 to LAN to use the main unit 101 as a LAN printer or a LAN scanner, a board having a LAN connecting function, for example, is connected in place of the communication control unit 111.

On the other hand, to increase or decrease the performance of the functions of the main unit 101, e.g., the display function (display unit 106), the reading function (reading unit 108), the printing function (printing unit 109), the memory function (DRAM 105), and the overall control function (CPU 102), the main unit 101 in which the performance of some or all functions is upgraded or downgraded is connected to the communication control unit 111. Consequently, it is possible to readily realize various versions of facsimile apparatuses and meet various needs of users.

The main unit 101 can also be constructed by adding a general-purpose i/f to a copying machine or by a personal computer having a general-purpose i/f.

Furthermore, the main unit 101 can be constructed by using only some functions of the main unit 101 described above. For example, a main unit is constructed by adding a general-purpose i/f to a display apparatus, a scanner apparatus, or a printer apparatus to realize the display function, reading function, or printing function, respectively. When the main unit 101 is a display apparatus or a printer apparatus, the communication control unit 111 has only a receiving function and displays and/or prints received data. When the main unit 101 is a scanner apparatus, the communication control unit 111 has only a transmitting function and transmits data read by the scanner.

Figure 2:
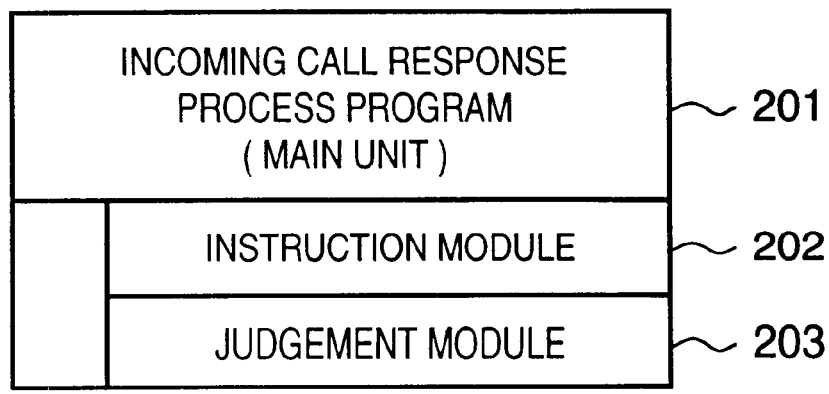
FIG. 2 is a memory map showing the arrangement of an incoming call response process program stored in the ROM of a main unit in the embodiment.
Figure 3:
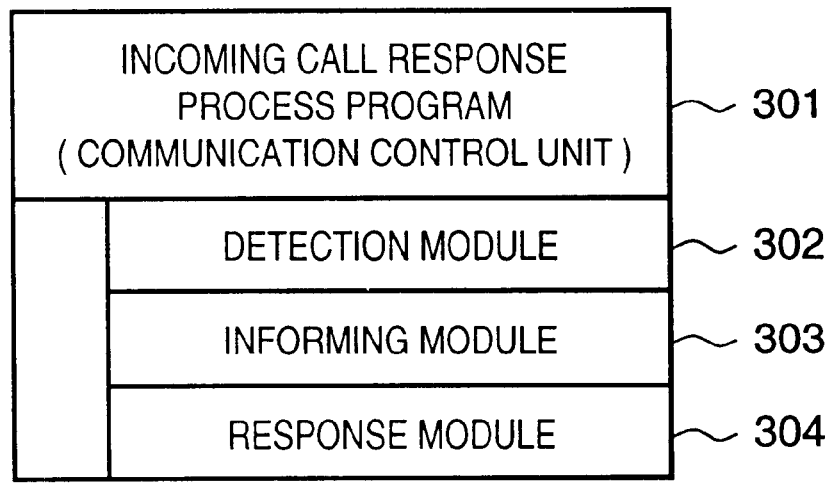
FIG. 3 is a memory map showing the arrangement of an incoming call response process program stored in the ROM of a communication control unit in the embodiment.

FIG. 2 is a memory map showing the arrangement of an incoming call response process program 201 stored in the ROM 103 of the main unit 101 of the facsimile apparatus shown in FIG. 1. FIG. 3 is a memory map showing the arrangement of an incoming call response process program 301 stored in the ROM 113 of the communication control unit 111.

When an incoming call arrives, an incoming call response process is executed in accordance with the incoming call response process programs stored in the ROMs 103 and 113. As shown in FIG. 2, the program 201 of the main unit 101 contains an instruction module 202 and a judgement module 203. The main unit 101 uses the instruction module 202 to instruct the communication control unit 111 to respond to the incoming call. The main unit 101 uses the judgement module 203 to make a judgement on whether the incoming call should be responded to or not.

As shown in FIG. 3, the program 301 of the communication control unit 111 contains a detection module 302 for detecting an incoming call, an informing module 303 for informing the main unit 101 of the incoming call, and a response module 304 for responding to the incoming call in accordance with the instruction from the main unit 101.

These incoming call response process programs can also be stored in a storage medium such as a floppy disk and downloaded, where necessary, into the RAMs (104, 105, and 114) of the communication control unit 111 by t he main unit 101.

More specifically, in the incoming call response process, the communication control unit 111 detects an incoming call and informs the main unit 101 of the incoming call. Upon receiving this information, the main unit 101 makes a judgement on whether the incoming call should be responded to or not. On the basis of the this judgement, the main unit 101 instructs the communication control unit 111 to respond to the incoming call. In accordance with this instruction, the communication control unit 111 responds to the incoming call.

Operations of this apparatus will be described below with reference to FIGS. 1 to 6.

Figure 4:
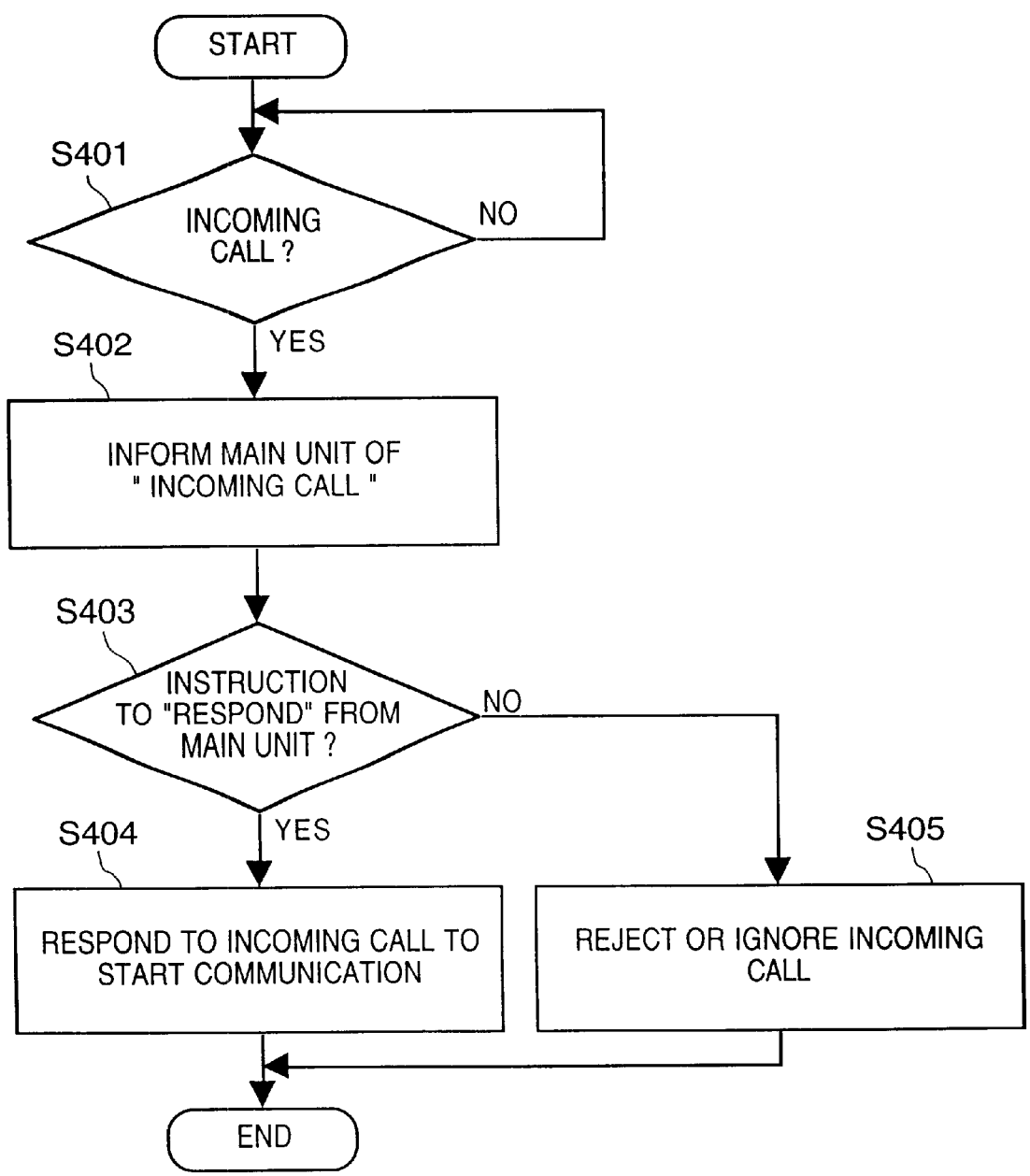
FIG. 4 is a flow chart showing an operation performed for an incoming call by the communication control unit in the embodiment.
Figure 5:
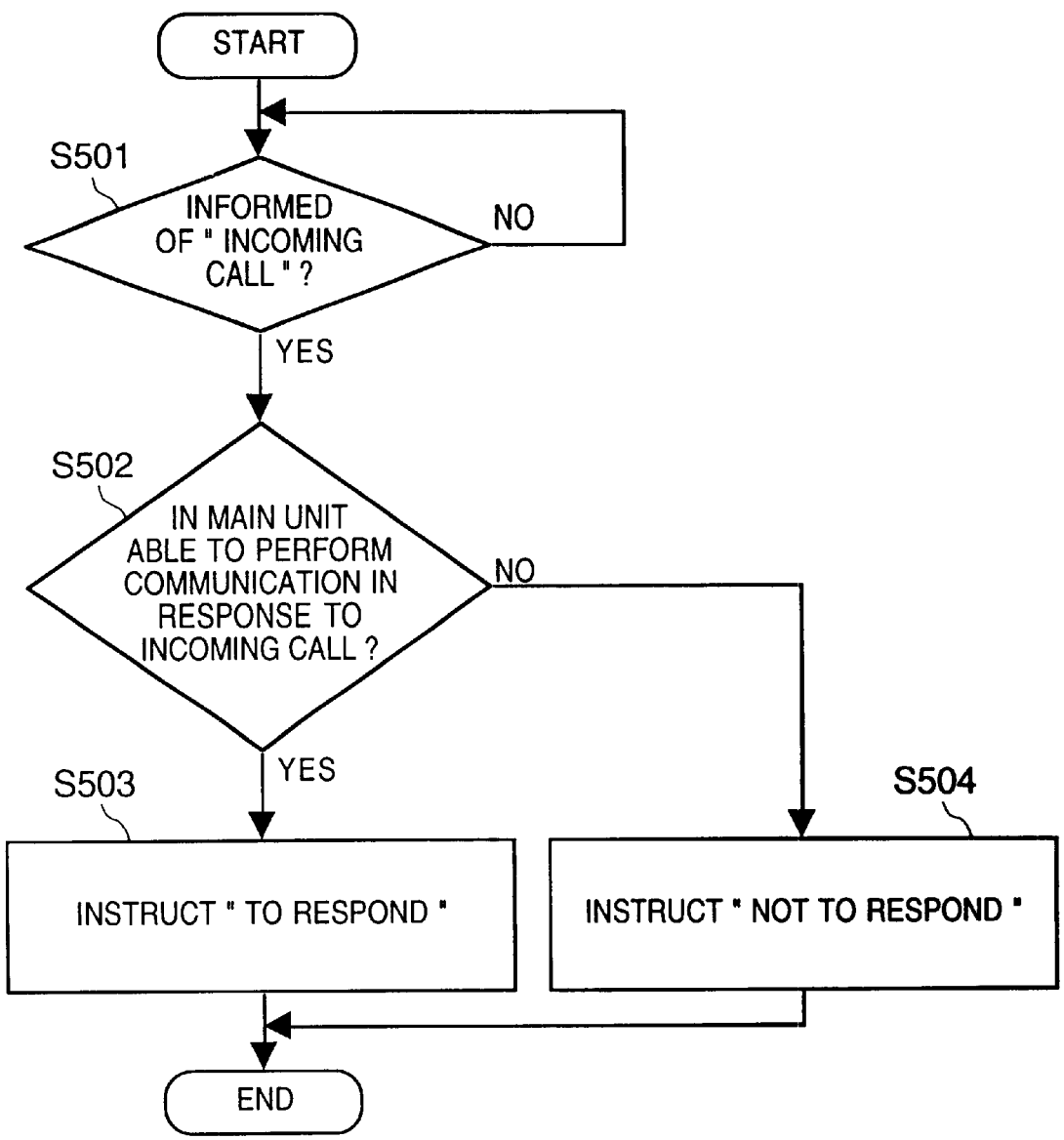
FIG. 5 is a flow chart showing an operation performed for an incoming call by the main unit in the embodiment.

FIG. 4 is a flow chart showing an operation performed for an incoming call by the CPU 112 of the communication control unit 111 in the facsimile apparatus. FIG. 4 corresponds to the incoming call response process program shown in FIG. 3. FIG. 5 is a flow chart showing an operation performed for incoming call information from the communication control unit 111 by the CPU 102 of the main unit 101. FIG. 5 corresponds to the incoming call process program shown in FIG. 2.

Figure 6:
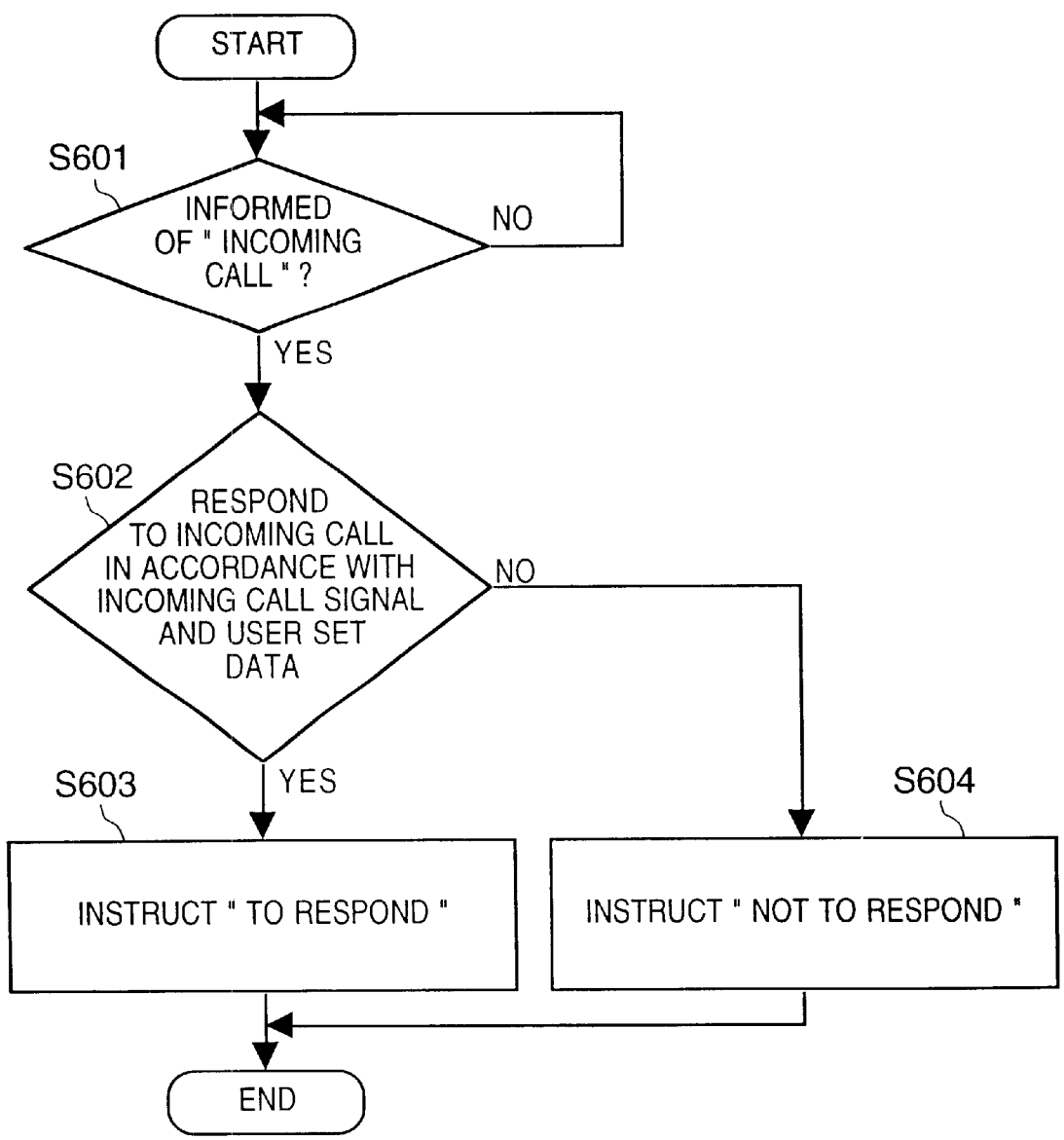
FIG. 6 is a flow chart showing another operation performed by the main unit when the main unit is informed of an incoming call by the communication control unit in the embodiment.

FIG. 6 is a flow chart, similar to FIG. 5, showing an operation performed for incoming call information from the communication control unit 111 by the main unit 101 to make a judgement in accordance with the state of the main unit 101 on whether the incoming call should be responded to or not. This judgement on whether the incoming call should be responded to or not is made on the basis of data set by the user.

First, an incoming call arrives (more specifically, call setup (SETUP) information of a partner terminal is received by the ISDN interface 119 through the ISDN line 120) in step S401 of FIG. 4. In step S402, the communication control unit 111 informs the main unit 101 of an "incoming call". More specifically, the communication control unit 111 sends a message "incoming call" to the main unit 101 through the parallel i/f 121. If necessary, the communication control unit 111 adds, e.g., calling party number information contained in the call setup (SETUP) information to the message "incoming call".

In step S501 of FIG. 5, the main unit 101 receives the "incoming call" information from the communication control unit 111. More specifically, the main unit 101 receives the message "incoming call" through the parallel i/f 110. In step S502, the main unit 101 makes a judgement on whether the main unit 101 can respond to the incoming call, i.e., can start communication in response to the incoming call.

If the main unit 101 is able to respond to the incoming call, the main unit 101 instructs the communication control unit 111 "to respond" and completes the process of the main unit 101 in step S503.

In step S403, the communication control unit 111 is instructed "to respond" by the main unit 101. In step S404, the communication control unit 111 responds to the incoming call to start communication through the ISDN interface 119 and completes the process of the communication control unit 111.

On the other hand, if the main unit 101 is unable to respond to the incoming call in step S502, the main unit 101 instructs the communication control unit 111 "not to respond" in step S504 and completes the process of the main unit 101.

The state wherein the main unit 101 cannot respond to the incoming call is as follows. For example, communication to be performed when the communication terminal has received an incoming call is facsimile reception, and the printing unit 109 does not have enough printing sheets, ink, or toner to perform the facsimile reception, or, the DRAM 105 does not have enough capacity to store the received facsimile data and hence not all facsimile data can be received, so the facsimile reception is impossible.

The CPU 102 checks the states of the printing unit 109 and/or the DRAM 105 and makes a judgement on whether the main unit 101 can respond to the incoming call.

If the communication control unit 111 is not instructed "to respond" by the main unit 101 in step S403, the communication control unit 111 rejects or ignores the incoming call to perform no communication in step S405 and completes the process of the communication control unit 111.

The incoming call response process described above need not be performed each time an incoming call arrives. However, this process is desirably performed whenever an incoming call arrives because it is in many cases impossible to know when the printing unit 109 becomes short of printing sheets, printing ink, or toner.

The process of making a judgement in accordance with the state of the main unit 101 on whether the incoming call should be responded to or not is described above. A process of making the same judgement in accordance with data set by the user will be described next.

The operation of the communication control unit 111 is the same as shown in FIG. 4 when the judgement on whether the incoming call should be responded to or not is made in accordance with the state of the main unit 101.

In step S601 of FIG. 6, the main unit 101 is informed of an "incoming call" by the communication control unit 111. In step S602, the main unit 101 makes a judgement in accordance with the incoming call signal data and the user data set in the main unit 101, e.g., stored in the SRAM 104, on whether the incoming call should be responded to, i.e., whether communication should be started in response to the incoming call.

Details of the method of making a judgement in accordance with the incoming call signal data and the user data will be described below.

For example, the incoming call signal data is calling party number information contained in the call setup (SETUP) information of a partner terminal. The user data set in the main unit 101 is number information corresponding to the calling party number information. The communication control unit 111 sends the calling party number information together with the information of the "incoming call" to the main unit 101. The main unit 101 collates the received calling party number information with the number information previously set in the SPAM 104. If the two pieces of information agree, the main unit 101 judges that the incoming call should be responded to. If the two pieces of information disagree, the main unit 101 judges that the incoming call should not be responded to. Since the judgement is made in this manner, a partner of communication can be selected. This prevents the reception of direct mails and the like.

In this embodiment, the call setup (SETUP) information in ISDN is used. However, if similar calling party number information services are available on PSTN (analog communication network), the judgement process can be executed under similar control.

If the main unit 101 judges in step S602 that the incoming call should be responded to, the main unit 101 instructs the communication control unit 111 "to respond" in step S603 and completes the process of the main unit 101.

If the main unit 101 judges in step S602 that the incoming call should not be responded to, the main unit 101 instructs the communication control unit 111 "not to respond" in step S604 and completes the process of the main unit 101.

In the above embodiment, the parallel i/fs 110 and 121 are used to connect the main unit 101 and the communication control unit 111. However, any other general-purpose i/fs can also be used. For example, it is possible to use low- or high-speed serial i/fs or radio i/fs using a medium such as infrared rays.

A processing of making a judgement on whether an incoming call should be rejected or ignored will be described below.

Figure 7:
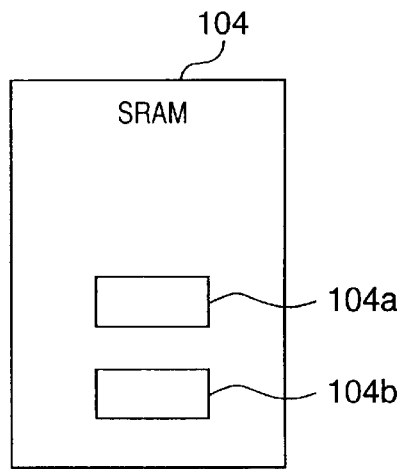
FIG. 7 is a view showing the arrangement of an SRAM in the embodiment.

The telephone number of the self-terminal, settings for rejecting an incoming call (sending a release completion message; REL COMP) or ignoring an incoming call (not responding to an incoming call) when call reception is impossible (to be described later), and other setting modes are registered in the SRAM 104 from the operation unit 107. As shown in FIG. 7, the setting for rejecting or ignoring an incoming call when the registered telephone number of the self-terminal and the called party number disagree is registered in an area 104*a* of the SRAM 104. The setting for rejecting or ignoring an incoming call when the registered telephone number of the self-terminal and the called party number agree and call reception is impossible due to the state of the apparatus is registered in an area 104*b* of the SRAM 104. The SRAM 104 also stores apparatus management data and image data in addition to the registered contents.

When an incoming call arrives from the ISDN line 120, the CPU 102 of the main unit 101 detects the contents registered in the SRAM 104 and the free space in the DRAM 105. On the basis of the detection results, the CPU 102 makes a judgement on whether call reception is possible. More specifically, the CPU 102 detects called party number information from an incoming call message from the ISDN line 120 and detects the state of the apparatus (e.g., the free space in the SRAM 104 for storing received images, the presence/absence of sheets, toner, or ink in the printing unit 109, and the operating state of the printing unit 109 or the reading unit 108). The CPU 102 makes a judgement in accordance with whether the telephone number of the self-terminal and the called party number information agree and with the detected apparatus state. On the basis of these judgement conditions, the CPU 102 makes a judgement on whether call reception is possible, call reception is impossible due to the apparatus state, or call reception is impossible because the registered telephone number of the self-terminal and the called party number information disagree. If the CPU 102 judges that call reception is possible, the CPU 102 sends an incoming call response message to the ISDN line 120. If the CPU 102 judges that call reception is impossible, the CPU 102 sends an incoming call rejection message to the ISDN line 120 or ignores the incoming call in accordance with the set contents of the SRAM 104. Details of this procedure of the main unit 101 will be described later.

The communication control unit 111 controls a D-channel communication protocol as call control for the ISDN line 120 and sends the incoming call response message or the incoming call rejection message (REL COMP message) to the ISDN line 120 in accordance with the instruction from the main unit 101. Details of this message sending procedure of the communication control unit 111 will be described later.

Figure 8:
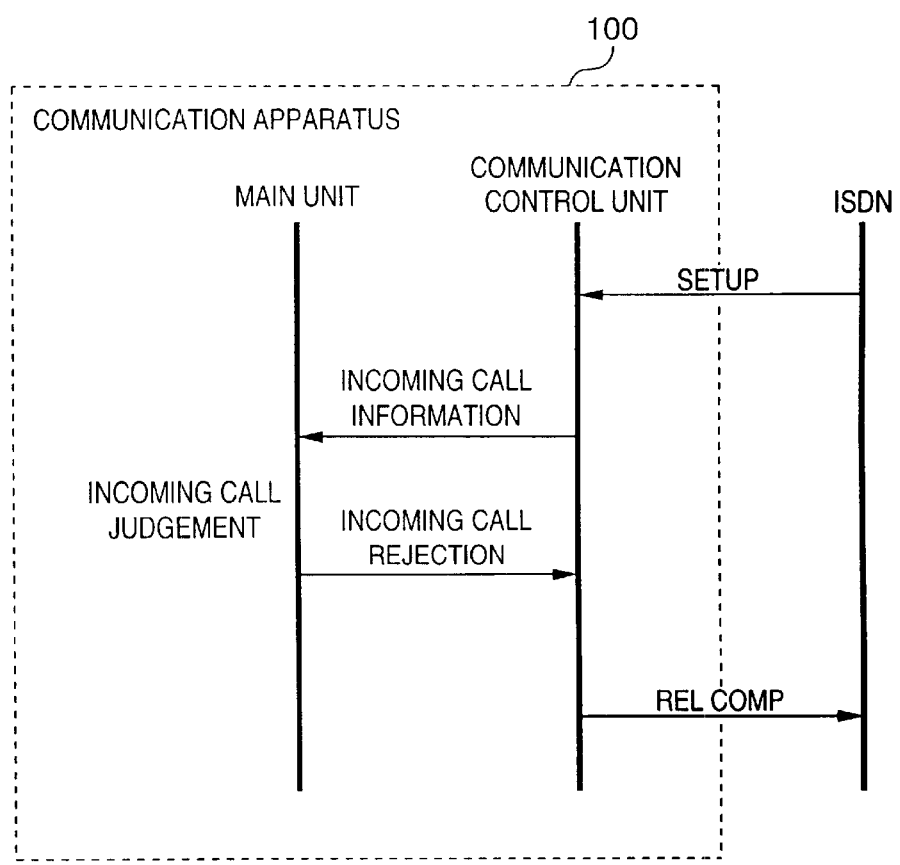
FIG. 8 is a view showing a process sequence for rejecting an incoming call from an ISDN line when call reception is impossible in the embodiment.
Figure 9:
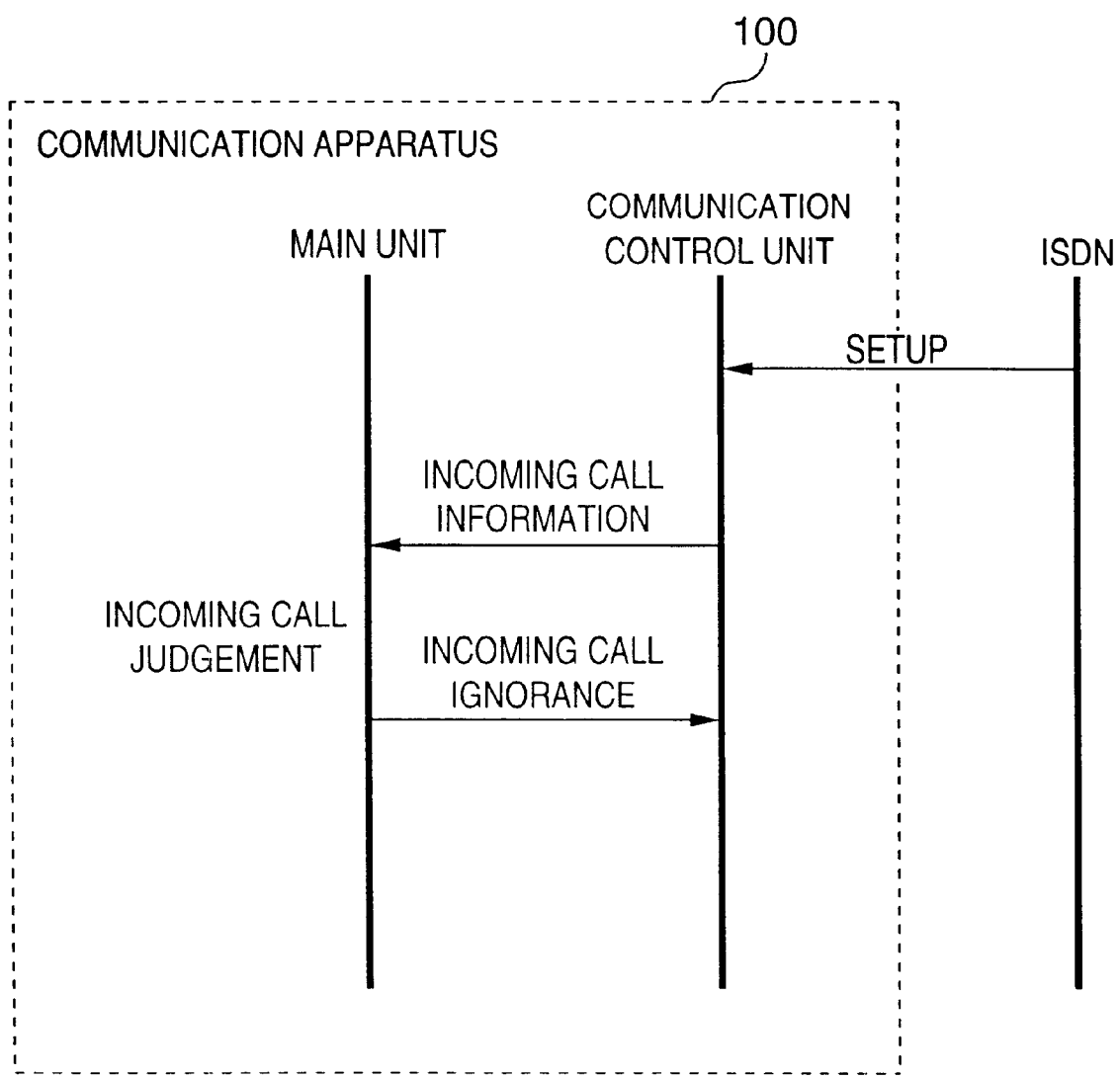
FIG. 9 is a view showing a process sequence for ignoring an incoming call from an ISDN line when call reception is impossible in the embodiment.

A process sequence for rejecting an incoming call from the ISDN line 120 and a process sequence for ignoring an incoming call from the ISDN line 120 when call reception is impossible will be described below with reference to FIGS. 8 and 9. FIG. 8 is a view showing the process sequence for rejecting an incoming call from the ISDN line 120 when call reception is impossible in the communication apparatus 100 shown in FIG. 1. FIG. 9 is a view showing the process sequence for ignoring an incoming call from the ISDN line 120 when call reception is impossible in the communication apparatus 100 shown in FIG. 1.

When an incoming call arrives from the ISDN line 120, as shown in FIG. 8, the ISDN interface 119 receives a SETUP command from the ISDN line 120, and the parallel i/f 121 informs the main unit 101 of the incoming call. Upon receiving this incoming call information, the CPU 102 of the main unit 101 makes the aforementioned judgement on the incoming call. If the CPU 102 judges that call reception is impossible, the CPU 102 determines in accordance with the contents of the SRAM 104 whether the incoming call from the ISDN line 120 is to be rejected or ignored. If a setting for rejecting an incoming call is registered in the SRAM 104, the parallel i/f 110 sends an instruction to reject the incoming call to the communication control unit 111. The ISDN interface 119 sends an incoming call rejection message (release completion message; REL COMP) to the ISDN line 120.

On the other hand, if a setting for ignoring an incoming call is registered in the SRAM 104, as shown in FIG. 9, the CPU 102 similarly makes a judgement on the incoming call from the ISDN line 120. If the CPU 102 judges that call reception is impossible, the parallel i/f 110 sends an instruction to ignore the incoming call to the communication control unit 111. The ISDN interface 119 disconnects the line without sending the incoming call rejection message (release completion message; REL COMP).

Figure 10:
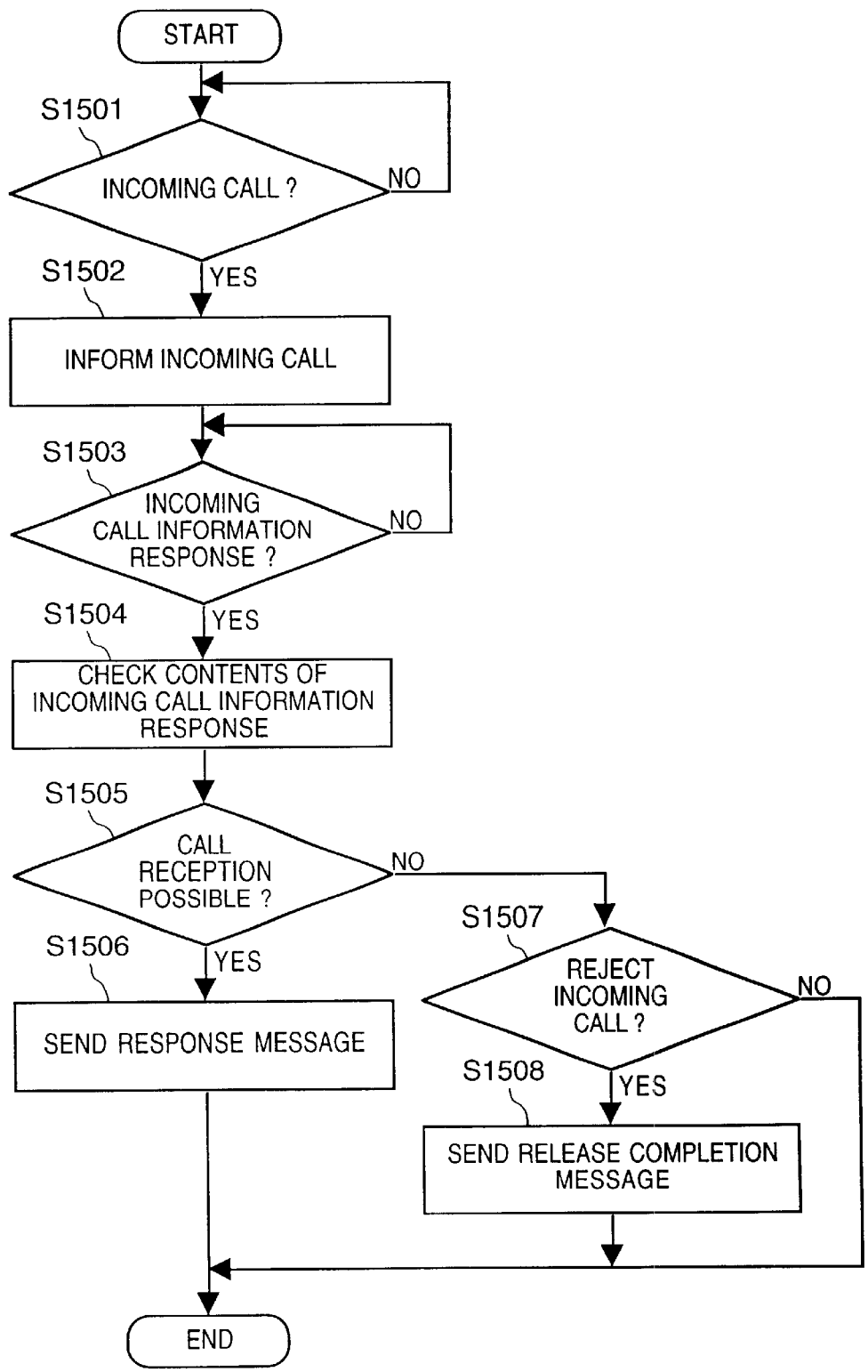
FIG. 10 is a flow chart showing a procedure of the communication control unit in the embodiment.

The procedure of the communication control unit 111 will be described below with reference to FIG. 10. FIG. 10 is a flow chart showing the procedure of the CPU 112 of the communication control unit 111 in the communication apparatus 100 shown in FIG. 1.

In step S1501, the CPU 112 monitors the presence/absence of an incoming call from the ISDN line 120. If an incoming call arrives, the CPU 112 informs the main unit 101 of the incoming call via the parallel i/f 121 in step S1502. In step S1503, the CPU 112 waits for an incoming call information response sent from the main unit 101 in response to the incoming call information. Upon receiving the incoming call information response sent from the main unit 101 via the parallel i/f 121, the CPU 112 checks the contents of the incoming call information response from the main unit 101 in step S1504.

The flow advances to step S1505, and the CPU 112 checks on the basis of the check result of the contents of the incoming call information response whether call reception is possible. If call reception is possible, the flow advances to step S1506, and the CPU 112 sends a response message for responding to the incoming call to the ISDN line 120 from the ISDN interface 119 and completes the process. If the CPU 112 determines on the basis of the check result of the contents of the incoming call information response that call reception is impossible, the flow advances to step S1507, and the CPU 112 checks on the basis of the check result of the contents of the incoming call information response whether incoming call rejection is designated. If incoming call rejection is designated, the flow advances to step S1508, and the CPU 112 sends a release completion message (incoming call rejection message) for informing incoming call rejection to the ISDN line 120 from the ISDN interface 119 and completes the process. After the process is complete, the line is disconnected. If incoming call rejection is not designated, the CPU 112 determines that the incoming call should be ignored. Therefore, the CPU 112 completes the process by skipping step S1508. After the process is complete, the line is disconnected.

Figure 11:
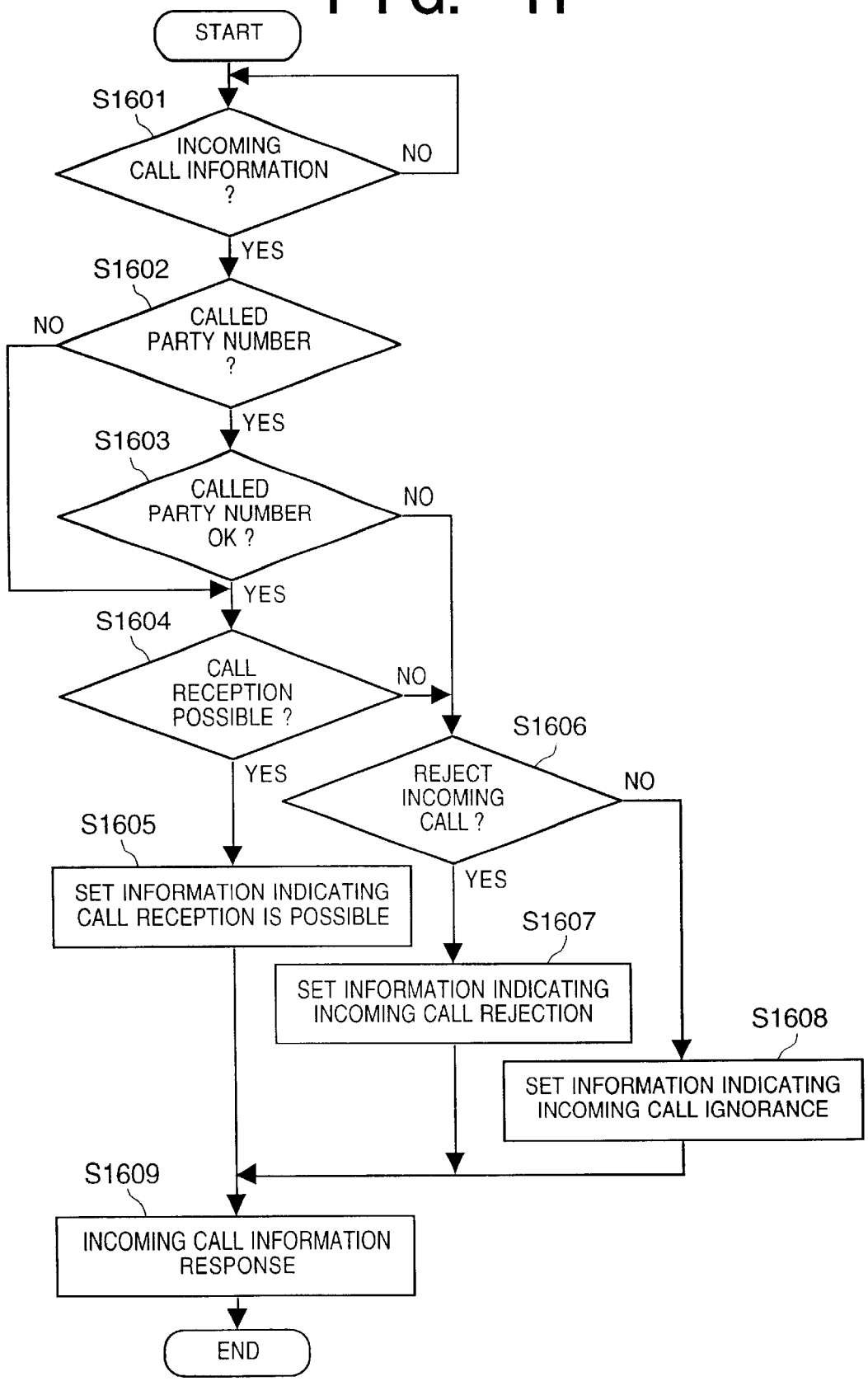
FIG. 11 is a flow chart showing a procedure of the main unit in the embodiment.

The procedure of the main unit 101 will be described below with reference to FIG. 11. FIG. 11 is a flow chart showing the procedure of the CPU 102 of the main unit 101 in the communication apparatus 100 shown in FIG. 1.

In step S1601, the CPU 102 monitors the presence/absence of incoming call information from the communication control unit 111. If incoming call information is sent from the communication control unit 111, the CPU 102 checks in step S1602 whether called party number information is sent from the ISDN line 120. If called party number information is sent from the ISDN line 120, the flow advances to step S1603. If no called party number information is sent from the ISDN line 120, the flow advances to step S1604 by skipping step S1603.

In step S1603, the CPU 102 checks whether the called party number information from the ISDN line 120 agrees with the telephone number of the self-terminal registered in the SRAM 104. If the called party number information from the ISDN line 120 agrees with the telephone number of the self-terminal stored in the SRAM 104, the flow advances to step S1604. In step S1604, the CPU 102 detects the apparatus state (e.g., the free space in the DRAM 105 for storing received images, the presence/absence of printing sheets, toner, and ink in the printing unit 109, and the operating state of the printing unit 109 or the reading unit 108). In accordance with these detection results, the CPU 102 checks whether call reception is possible. If call reception is possible, the flow advances to step S1605, and the CPU 102 writes information indicating that call reception is possible in an incoming call information response to be sent to the communication control unit 111. In step S1609, the CPU 102 sends the incoming call information response in which the information indicating that call reception is possible is written to the communication control unit 11 from the parallel i/f 110 and completes the process.

In step S1606, in accordance with whether the setting for rejecting an incoming call is registered in the SRAM 104, the CPU 102 checks whether the incoming call is to be rejected. More specifically, if the CPU 102 determines in step S1603 that the called party number information from the ISDN line 120 disagrees with the telephone number of the self-terminal registered in the SRAM 104, the CPU 102 executes step S1606 in accordance with the contents set in the area 104a of the SRAM 104. If the CPU 102 determines in step S1604 that call reception is impossible, the CPU 102 executes step S1606 in accordance with the contents set in the area 104b of the SRAM 104. If the setting for rejecting an incoming call is registered in the areas 104a and 104b of the SRAM 104, the CPU 102 determines in step S1606 that the incoming call is to be rejected, and the flow advances to step S1607. In step S1607, the CPU 102 writes information indicating incoming call rejection in an incoming call information response to be sent to the communication control unit 111. In step S1609, the CPU 102 sends the incoming call information response in which the information indicating incoming call rejection is written to the communication control unit 111 from the parallel i/f 110, and completes the process. If the setting for rejecting an incoming call is not registered in the areas 104a and 104b of the SRAM 104, the CPU 102 determines in step S1606 that the incoming call is to be ignored, and the flow advances to step S1608. In step S1608, the CPU 102 writes information indicating incoming call ignorance in an incoming call information response to be sent to the communication control unit 111. In step S1609, the CPU 102 sends the incoming call information response in which the information indicating incoming call ignorance is written to the communication control unit 111 from the parallel i/f 110, and completes the process.

As described above, in accordance with the apparatus state detected together with whether the registered telephone number of the self-terminal and the called party number information agree, the CPU 102 checks for an incoming call whether call reception is possible, call reception is impossible due to the apparatus state, or call reception is impossible because the registered telephone number of the self-terminal and the called party number information disagree. If the CPU 102 determines that call reception is possible, the CPU 102 sends an incoming call response message to the ISDN line 120. If the CPU 102 determines that call reception is impossible, the CPU 102 sends an incoming call rejection message to the ISDN line 120 or ignores the incoming call in accordance with the contents set in the SRAM 104. Accordingly, it is possible to set conditions convenient for the user, resulting in convenience.

When the setting for ignoring an incoming call is registered in the area 104a of the SRAM 104, another apparatus can respond to an incoming call addressed to the apparatus. When the setting for rejecting an incoming call is registered in the area 104b of the SRAM 104, the calling party can be informed of the inability to respond.

It is possible to register the setting for rejecting an incoming call in only one of the areas 104a and 104b of the SRAM 104. It is also possible to register the setting for rejecting an incoming call in both or neither of the two areas.

When a plurality of telephone numbers are registered as the telephone number of the self-terminal in the SRAM 104, it is determined that the telephone number of the self-terminal and the called party number information agree if the called party number information agrees with one of the telephone numbers registered as the telephone number of the self-terminal.

If NO in step S1602, the flow can also advance to step S1606. If this is the case, the judgement in step S1606 is made in accordance with the contents set in the area 104a of the SRAM 104.

The process of accepting, rejecting, or ignoring an incoming call can also be selected in accordance with the calling party number, instead of the called party number.

If the printing unit 109 is detachable, the CPU 102 checks the presence/absence of the printing unit 109 in step S1604. If the printing unit 109 is not connected, the flow advances to step S1606.

Transmitting operations of the facsimile apparatus which performs the receiving operations shown in FIGS. 4, 5, 6, 10, and 11 will be described below.

Referring to FIG. 1, the CPU 102 controls the main unit 101 and manages the date and time at that point. The DRAM 105 stores image data to be facsimile-transmitted and the number of pages of the data. The operation unit 107 is used by the user to designate the operation of the apparatus or register the abbreviation of a calling party and a destination. The parallel i/f 110 can perform two-way communications with the communication control unit 111 and exchanges parameters and data necessary to control the communication control unit 111 and image data to be facsimile-transmitted or facsimile-received image data.

A ROM 113 stores programs for controlling the whole communication control unit 111, font data corresponding to header information, and the like.

A parallel i/f 121 can perform two-way communications with the main unit 101 and exchanges necessary parameters and data, image data to be facsimile-transmitted, and facsimile-received image data with the main unit 101.

Figure 12:
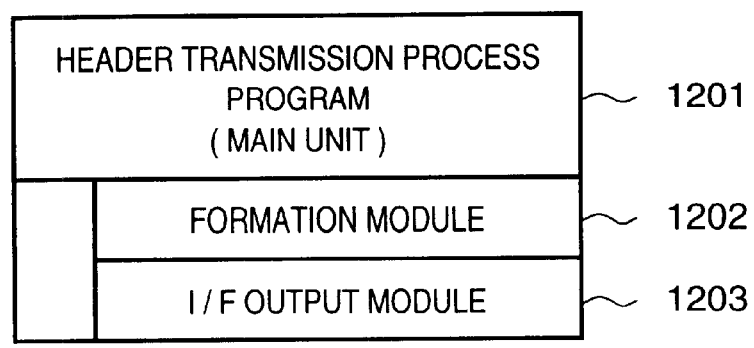
FIG. 12 is a memory map showing the arrangement of a header transmission program stored in the ROM of the main unit.
Figure 13:
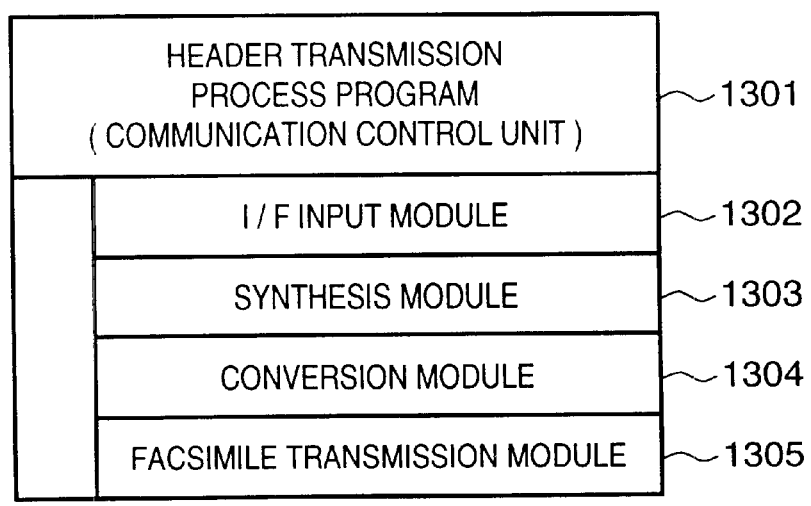
FIG. 13 is a memory map showing the arrangement of a header transmission program stored in the ROM of the communication control unit.

FIG. 12 is a memory map showing the arrangement of a header transmission process program 1201 stored in the ROM 103 of the main unit 101. FIG. 13 is a memory map showing the arrangement of a header transmission process program 1301 stored in the ROM 113 of the communication control unit 111.

When facsimile transmission is performed, a header transmission process is executed in accordance with the header transmission process programs 1201 and 1301 stored in the ROMs 103 and 113 shown in FIGS. 12 and 13.

That is, as shown in FIG. 12, the header transmission process program 1201 of the main unit 101 includes a formation module 1202 and an i/f output module 1203. The formation module 1202 forms header information of facsimile transmission data corresponding to a facsimile transmission instruction from the user by using a format selected in accordance with a transmission mode. The i/f output module 1203 transfers the formed header information to the communication control unit 111 via the parallel i/f 110. Also, as shown in FIG. 13, the header transmission process program 1301 of the communication control unit 111 includes an i/f input module 1302, a synthesis module 1303, a conversion module 1304, and a facsimile transmission module 1305. The i/f input module 1302 receives the header information from the main unit 101 via the parallel i/f 121. The synthesis module 1303 reads out font data corresponding to the header information from the ROM 113 of the communication control unit 111 and synthesizes transmission data. The conversion module 1304 converts the coding system and resolution of image data. The facsimile transmission module 1305 facsimile-transmits the transmission data to which the header information is added.

The header transmission process programs 1201 and 1301 can also be stored in a storage medium such as a floppy disk and downloaded, where necessary, into the RAMs (104, 105, and 114) of the main unit 101 and the communication control unit 111.

More specifically, in the header transmission process, the main unit 101 detects a facsimile transmission operation by the user, regardless of whether the operation is G3 facsimile transmission or G4facsimile transmission. The main unit 101 forms header information corresponding to facsimile transmission data to be facsimile-transmitted, and transfers the header information to the communication control unit 111 via the parallel i/fs 110 and 121. The communication control unit 111 reads out font data corresponding to the header information from the main unit 101 and converts the font data such that the data has the same coding system and resolution as the transmission data. The communication control unit 111 adds the converted header information to the transmission data and facsimile-transmits the integrated header information and facsimile transmission data.

The above operation of forming and transmitting header information will be described in detail below.

Figure 14:
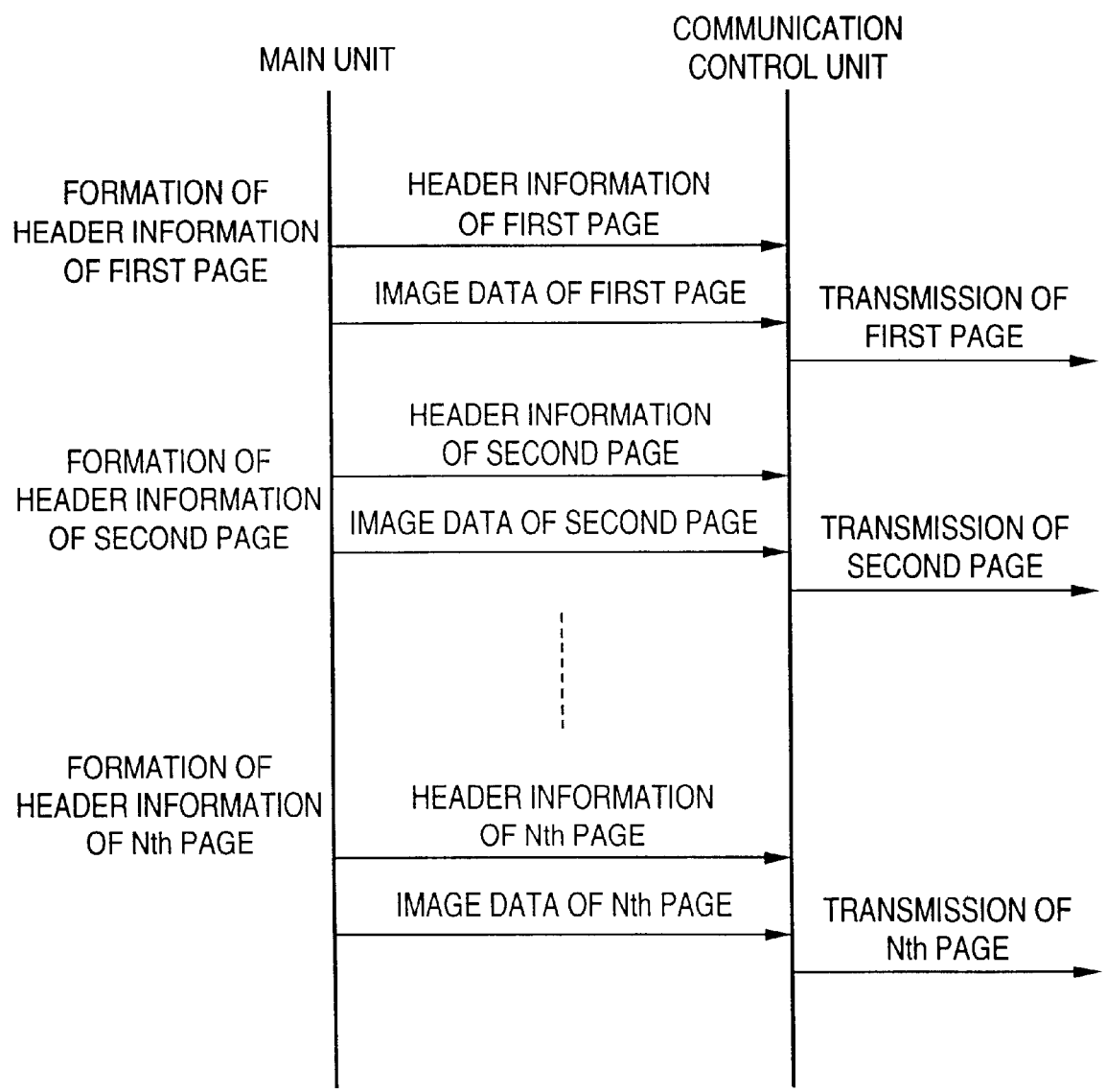
FIG. 14 is a view showing the flows of header information and image data between the main unit and the communication control unit when an N-page original is facsimile-transmitted.

FIG. 14 is a view showing the flows of header information and image data between the main unit 101 and the communication control unit 111 when an N-page original is facsimile-transmitted. As shown in FIG. 14, when the user designates transmission, the main unit 101 forms header information of the first page of transmission originals and transfers the formed header information and image data of the first page to the communication control unit 111. The main unit 101 similarly forms header information of the second page to the Nth page and transfers the formed header information and image data to the communication control unit 111. Upon receiving the header information and image data in units of pages from the main unit 101, the communication control unit 111 synthesizes the information and data and facsimile-transmits the synthesized information and data in units of pages.

Figure 15:
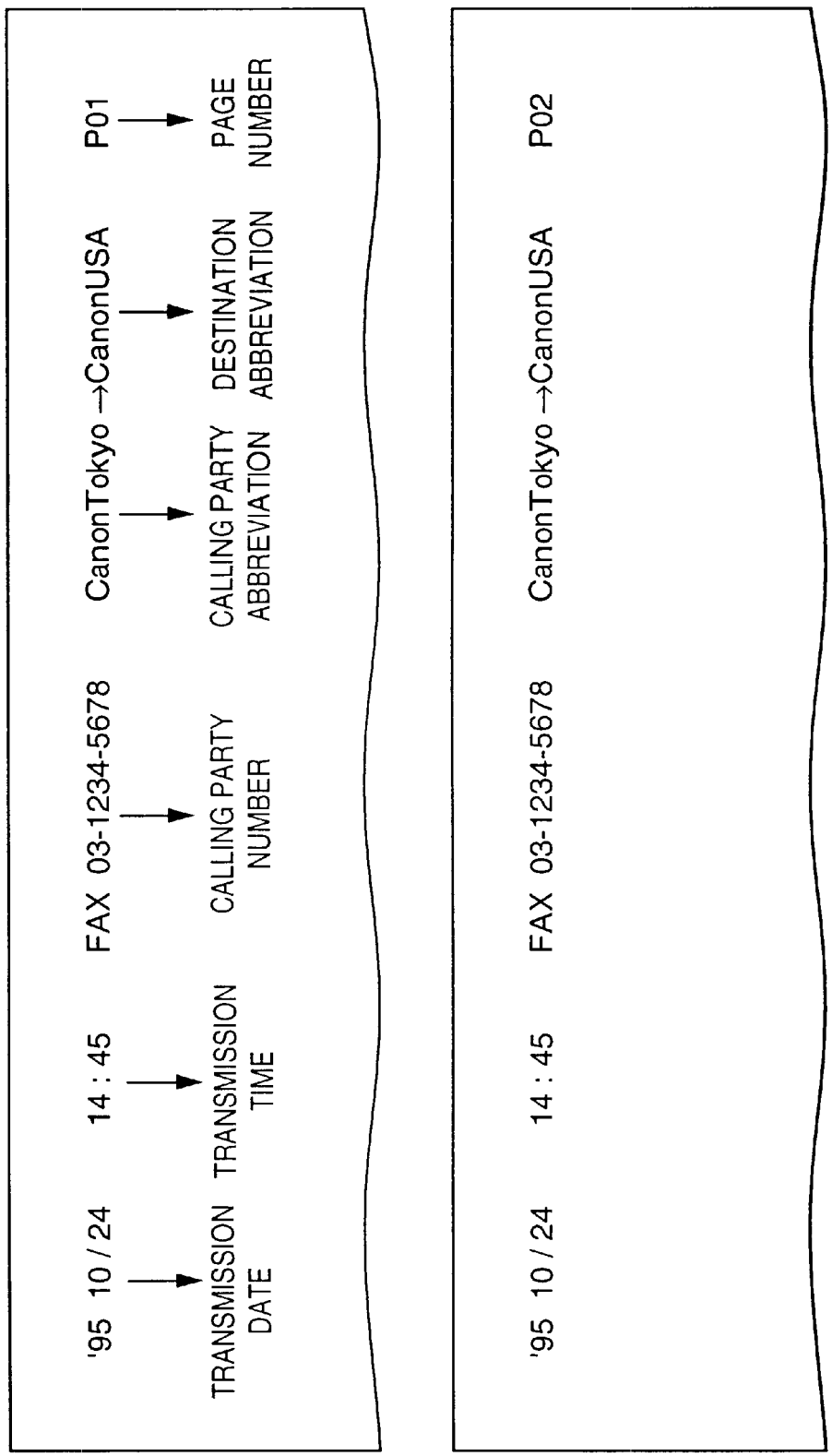
FIG. 15 is a view showing an example of a facsimile header in a "direct transmission mode"
Figure 16:
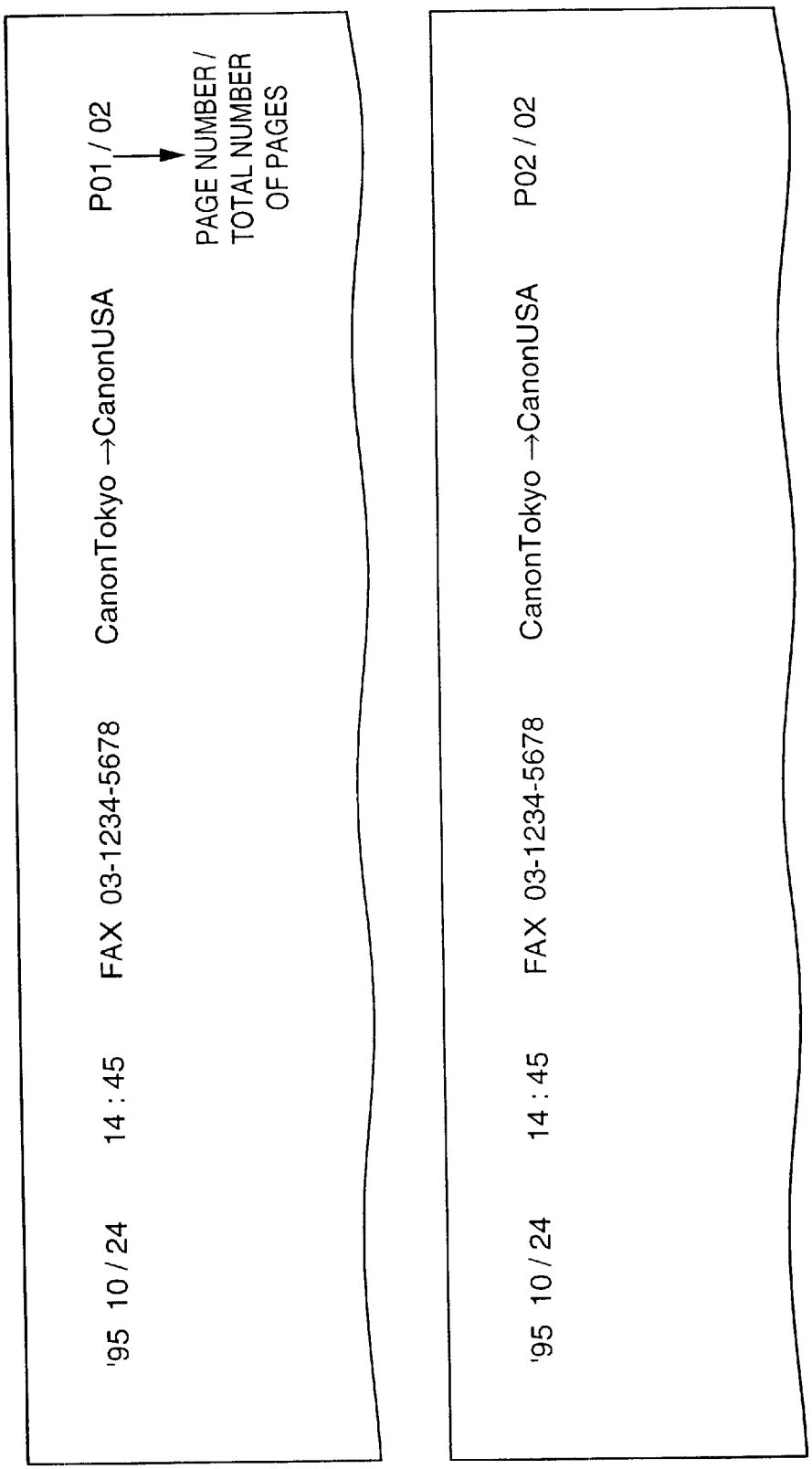
FIG. 16 is a view showing an example of a facsimile header in a "memory transmission mode"

FIGS. 15 and 16 are views showing examples of facsimile headers in this embodiment. FIG. 15 is an example of a facsimile header in a "direct transmission mode". FIG. 16 is an example of a facsimile header in a "memory transmission mode".

When the user performs a facsimile transmission operation in the "direct transmission mode", the facsimile apparatus immediately performs a calling operation for the line. After the call is connected to the receiving terminal, the facsimile apparatus starts reading the transmission original and facsimile-transmits the read transmission original to the receiving terminal without storing the read original in the memory of the facsimile apparatus.

On the other hand, when the user performs a facsimile transmission operation in the "memory transmission mode", the facsimile apparatus starts reading a transmission original and stores the read transmission originals in the memory (in this embodiment, the DRAM 105) of the facsimile apparatus. After that, the facsimile apparatus performs a calling operation and facsimile-transmits the transmission original data in the memory 105.

This embodiment will be explained by taking a facsimile apparatus having both of the "direct transmission mode" and the "memory transmission mode" as an example. However, it is of course also possible to use an apparatus having only one of the "direct transmission mode" and the "memory transmission mode". If this is the case, one of the following processes need only be executed.

In the "direct transmission mode", it is usually difficult to check the total number of pages of the original to be transmitted until facsimile transmission is complete on the transmitting side. In the "memory transmission mode", the total number of pages of the original to be transmitted can be checked when the reading unit 108 has completely read the original.

Accordingly, although the total number of pages of the original to be transmitted cannot be added to the facsimile header in the "direct transmission mode", it can be added in the "memory transmission mode".

As shown in FIGS. 15 and 16, the facsimile header contains "transmission date" and "transmission time" indicating the date and time of the transmission operation, "calling party number" indicating the facsimile number of the transmitting apparatus, "calling party abbreviation" identifying the calling party, "destination abbreviation" identifying the receiving side expected to perform facsimile reception, "page number", and "total number of pages".

FIGS. 15 and 16 show the transmission of two-page originals. In the direct transmission, the format has only the page number like "P01" (first page) and "P02" (second page). In the memory transmission, a different format can be made by the page number/the total number of pages like "P01/02" (first page) and "P02/02" (second page).

Figure 17:
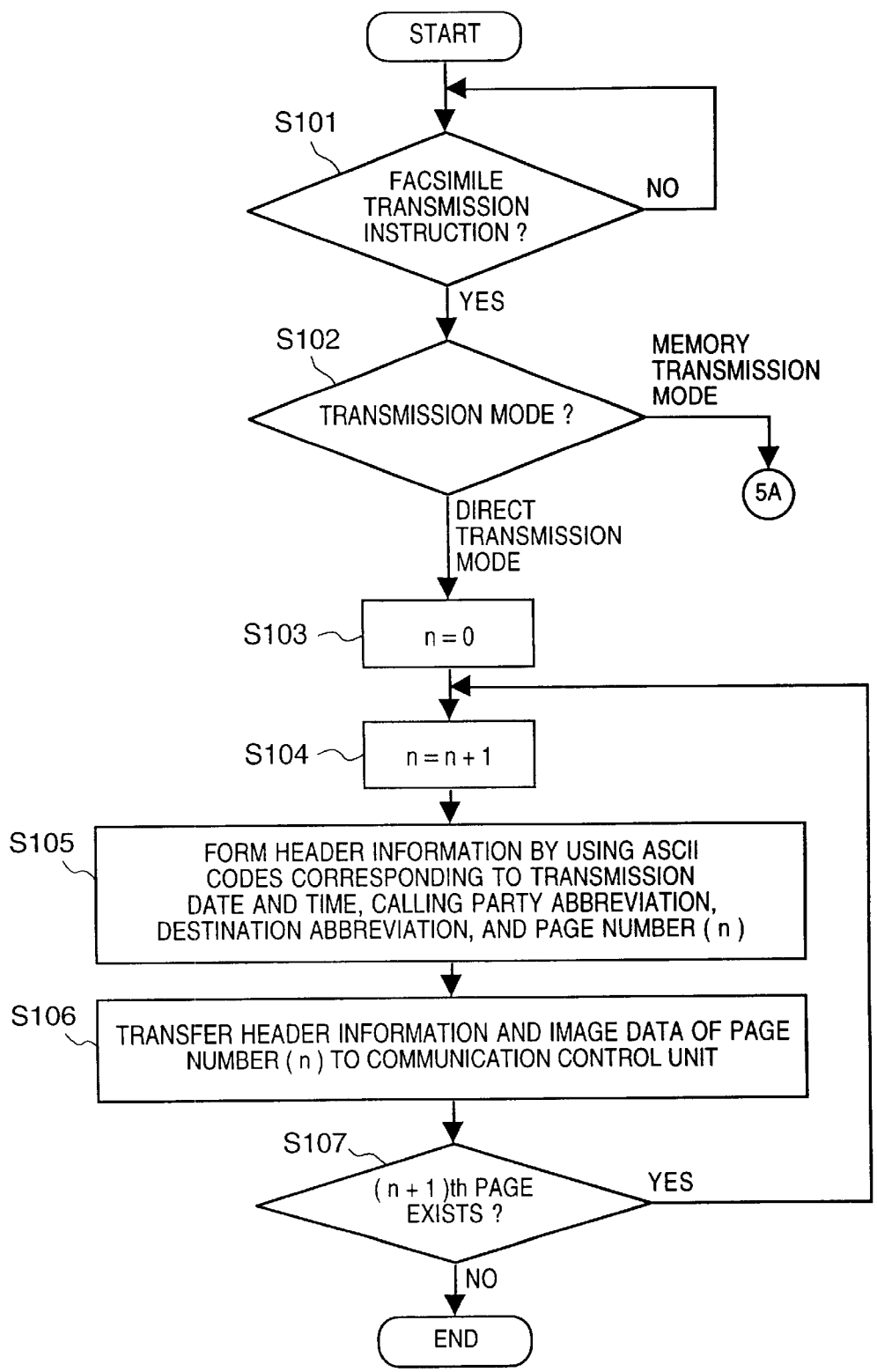
FIG. 17 is a flow chart showing an operation performed by the main unit to form and transfer header information to the communication control unit in the embodiment.
Figure 18:
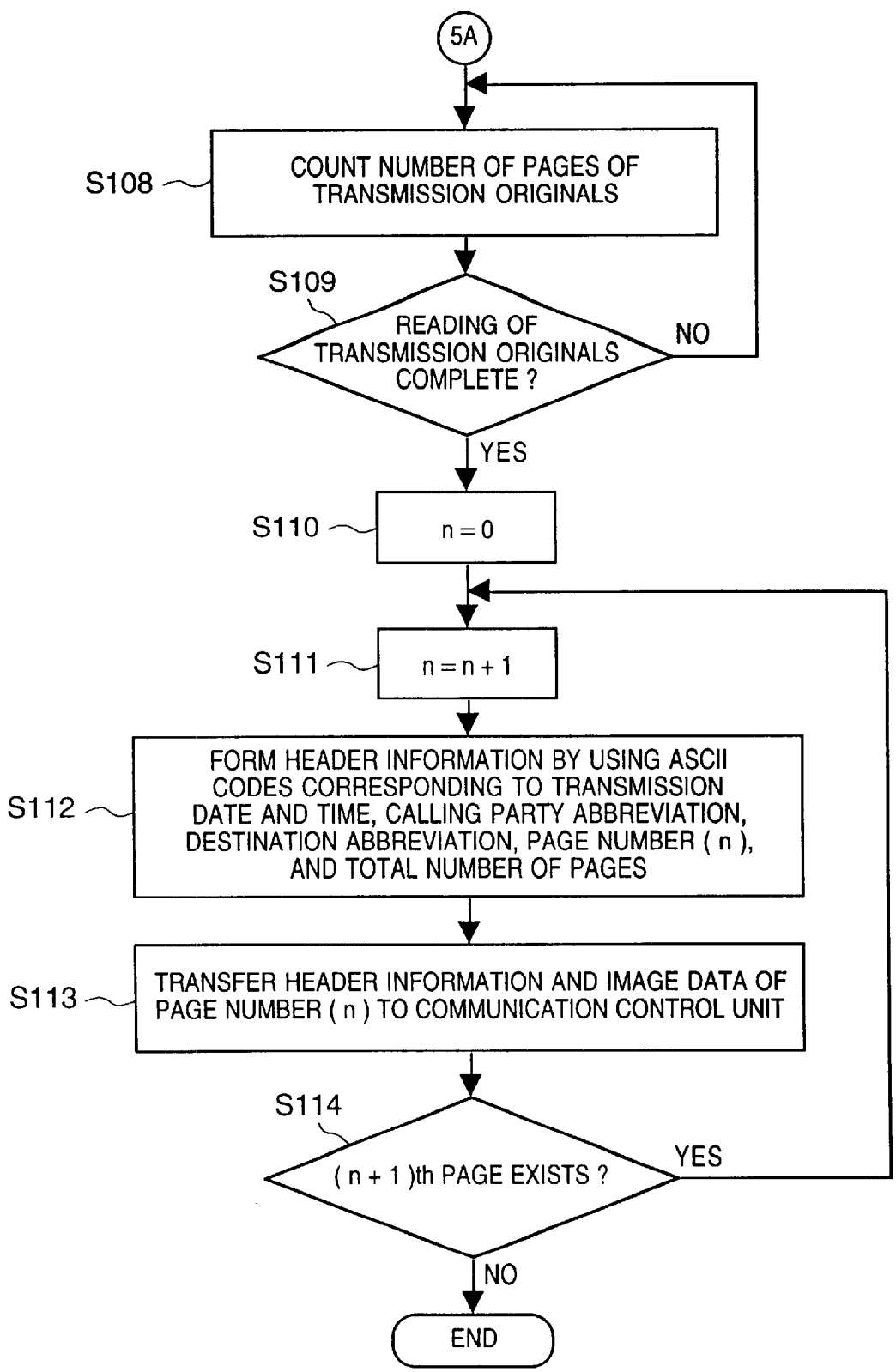
FIG. 18 is a flow chart showing the operation performed by the main unit to form and transfer header information to the communication control unit in the embodiment.
Figure 19:
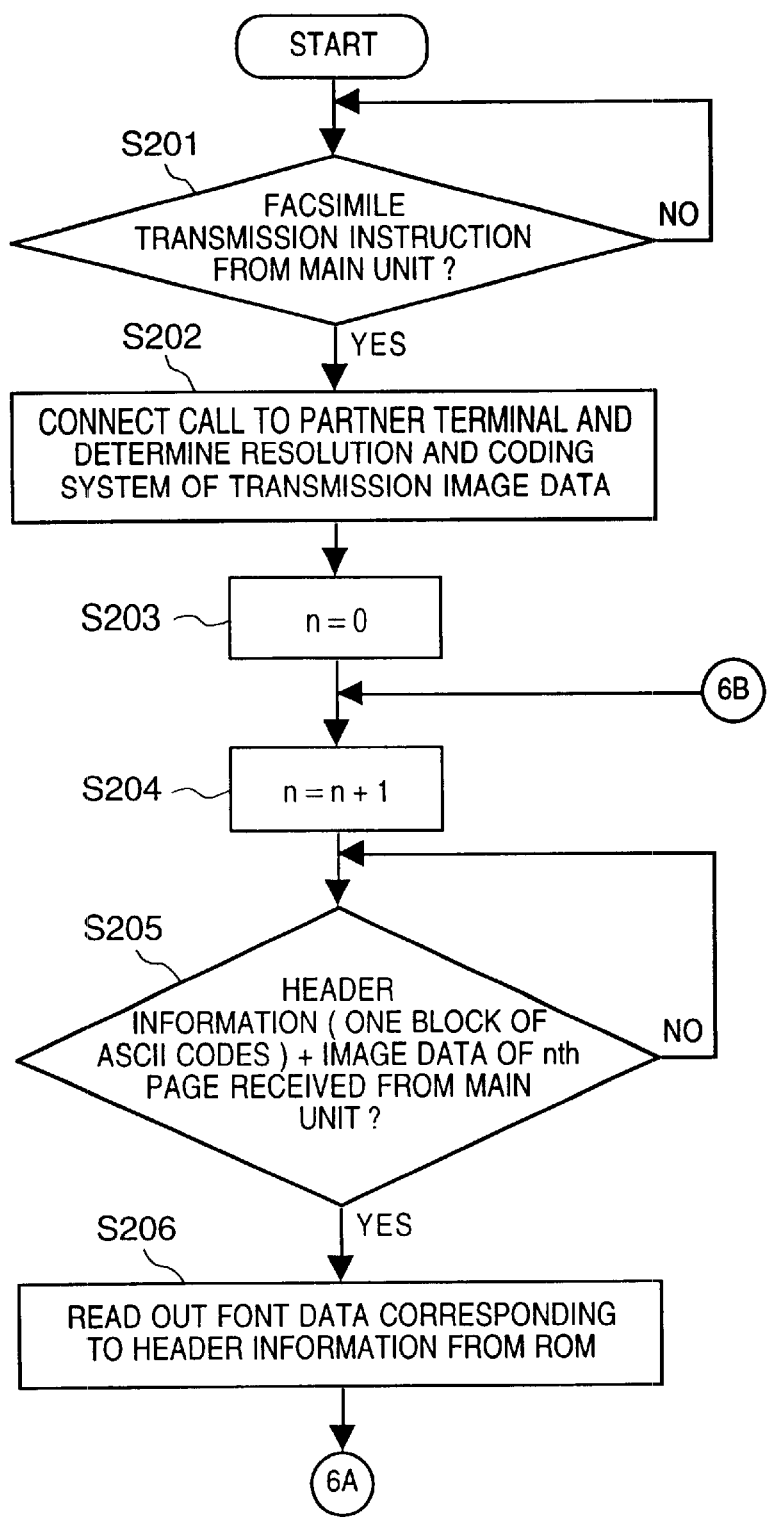
FIG. 19 is a flow chart showing an operation performed by the communication control unit to receive the header information from the main unit and perform facsimile transmission in the embodiment.
Figure 20:
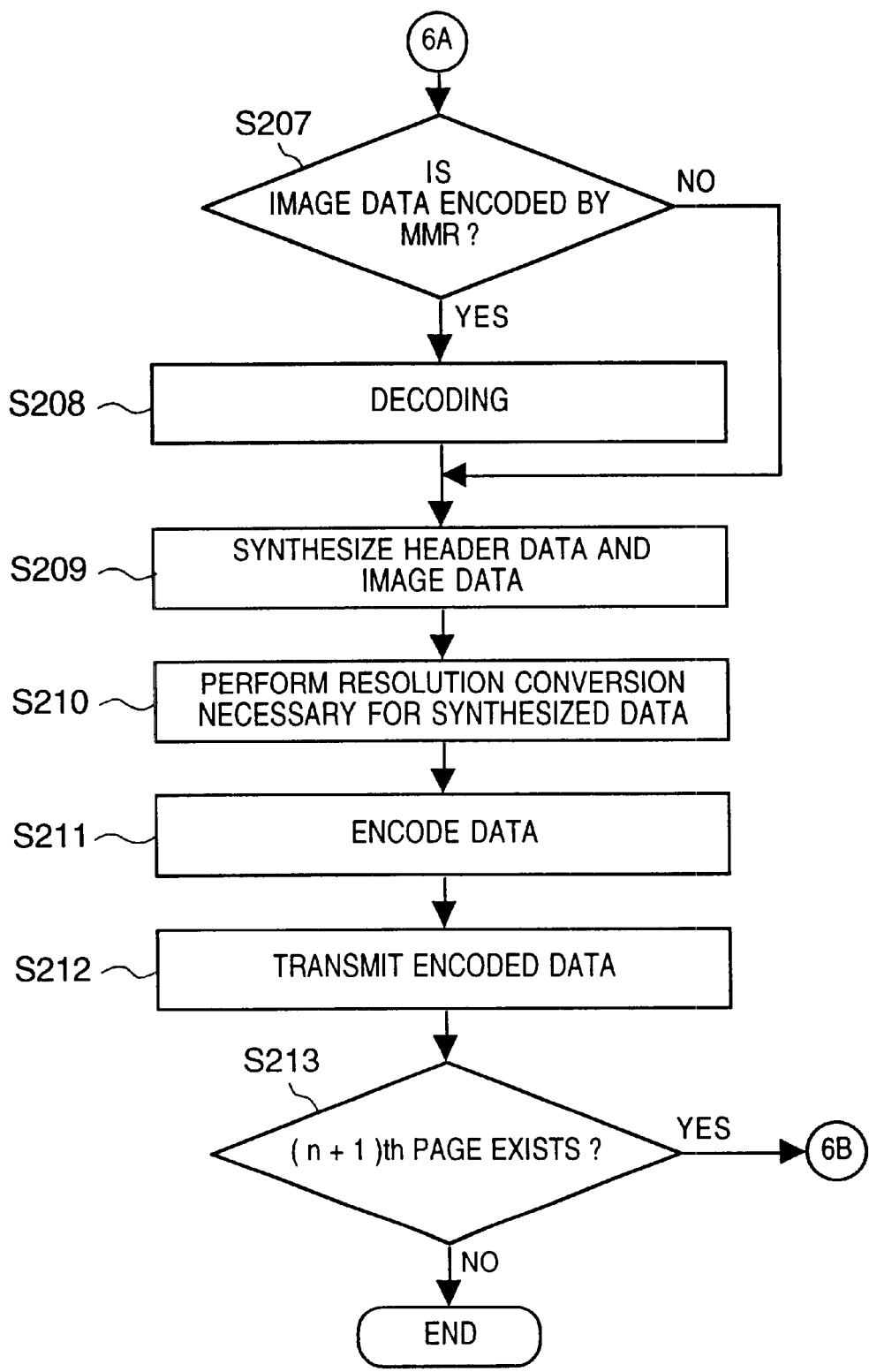
FIG. 20 is a flow chart showing the operation performed by the communication control unit to receive the header information from the main unit and perform facsimile transmission in the embodiment.

Details of the operations of the main unit 101 and the communication control unit 111 will be described below with reference to FIGS. 17 to 20. FIGS. 17 and 18 are flow charts showing the operation performed by the main unit 101 to form and transfer header information to the communication control unit 111. This operation corresponds to the header transmission process program 1201 shown in FIG. 12. FIGS. 19 and 20 are flow charts showing the operation performed by the communication control unit 111 to receive the header information from the main unit 101 and facsimile-transmit the header information. This operation corresponds to the header transmission process program 1301 shown in FIG. 13.

In step S101 shown in FIG. 17, the user sets the pages of a transmission original on the reading unit 108 of the main unit 101 and performs a transmission operation, e.g., inputs the facsimile number from the operation unit 107. The CPU 101 detects and recognizes this operation. At the same time, the user sets one of the "direct transmission mode" and the "memory transmission mode" described above. In step S102, the CPU 102 checks whether the transmission mode set by the user is the "direct transmission mode" or the "memory transmission mode". If the "direct transmission mode" is set, the flow advances to step S103, and the CPU 102 sets 0 in an arbitrary parameter n indicating the page number. The CPU 102 also transmits a facsimile transmission instruction to the communication control unit 111 via the parallel i/f 110 to inform the communication control unit 111 of the facsimile number of the receiving facsimile terminal and the like. The flow then advances to step S104, and the CPU 102 sets 1 in n by n=n+1 in order to process the first page. In step S105, the CPU 102 forms header information.

As shown in FIG. 15, the header in this "direct transmission mode" contains the transmission date, transmission time, calling party number, calling party abbreviation, destination abbreviation, and page number. The header information is formed as one block of an ASCII code sequence by replacing the individual parameters with ASCII codes as one text data.

More specifically, since the CPU 102 manages the transmission date and time, the CPU 102 reads these parameters and replaces them with ASCII codes. Also, the calling party number, calling party abbreviation, and destination abbreviation are usually registered as user data. Therefore, the CPU 102 reads out the area of the SRAM 104 storing these data and replaces the individual parameters with ASCII codes. If these parameters are not registered as user data, the CPU 102 replaces them with ASCII codes corresponding to spaces. As the page number, the CPU 102 replaces the value of n obtained in step S104, i.e., 1 for the first page and 2 for the second page, with an ASCII code.

In accordance with the header format determined by the operation mode (in this embodiment, the "direct transmission mode") at that time, the CPU 102 arranges the ASCII codes corresponding to the individual parameters and ASCII codes replacing other auxiliary symbols (e.g., /, :, and →) and spaces on the format and completes one block of an ASCII code row as the header information.

In a regular A4 original, for example, 1 line=1,728 dots for standard facsimile resolution (8 pels). Therefore, if the font data of the header has 16×16 bits, a facsimile header having 1728÷16=108 characters can be formed. Accordingly, one-block header information is formed by 108-byte ASCII code data when half-size ASCII codes are used.

Next, in step S106, the CPU 102 transfers the header information formed in step S105 and image data of the page number (n) read by controlling the reading unit 108 before the header information is formed to the communication control unit 111 via the parallel i/fs 110 and 121. The transfer order of the header information and the image data is not particularly limited. In the "direct transmission mode", a transmission original is read and facsimile-transmitted by the communication control unit 111 within a short time period. So, the transmission original is immediately transferred to the communication control unit 111 after being read. Accordingly, image data is transferred as raw data without being encoded. However, the transfer time can usually be shortened when the data amount is compressed by encoding. If the performance of the main unit 101 is high, therefore, image data is transferred to the communication control unit 111 after being encoded by, e.g., run-length coding or MMR coding.

The flow then advances to step S107. If the original pages set to be facsimile-transmitted by the user still exist, e.g., if the next original page to be read and facsimile-transmitted remains on the reading unit 108 (i.e., if the original sensor of the reading unit 108 is ON) or if the next original page is being read, the header transmission process by the CPU 102 returns to step S104 to form the header information of the next page. The CPU 102 can also simultaneously perform the process (S106) of transferring the nth page to the communication control unit 111 and the process (S105) of forming the header information of the (n+1)th page.

In step S107, if no next original page to be transmitted exists, i.e., if the CPU 102 completely forms the header information of all pages and transfers the header information to the communication control unit 111, the CPU 102 completes this process of the main unit 101.

On the other hand, if the CPU 102 determines in step S102 that the transmission mode set by the user is the "memory transmission mode", the flow advances to step S108. In step S108, the CPU 102 controls the reading unit 108 to read the original set on the reading unit 108 and stores the read image data in the DRAM 105, because the transmission mode is the "memory transmission mode", by encoding the data into, e.g., MMR codes having a high compression ratio. In parallel with these processes, the CPU 102 counts the total number of pages of the transmission original.

If the CPU 102 determines in step S109 that the reading unit 108 completes the transmission original reading process, the flow advances to step S101, and the CPU 102 sets 0 in the arbitrary parameter n indicating the page number used to form header information. Also, the CPU 102 transmits a facsimile transmission instruction to the communication control unit 111 via the parallel i/f 110 to inform the communication control unit 111 of the facsimile number of the receiving facsimile terminal and the like. The flow then advances to step S111, and the CPU 102 sets 1 in n by n=n+1 in order to process the first page. In step S112, the CPU 102 forms header information.

As shown in FIG. 16, this header in the "memory transmission mode" contains the transmission date, transmission time, calling party number, calling party abbreviation, destination abbreviation, page number, and total number of pages. As in the "direct transmission mode", the CPU 102 forms the header information as one block of an ASCII code sequence by replacing the individual parameters and auxiliary symbols and spaces for the format with ASCII codes as one text data. As the total number of pages, the CPU 102 replaces the value obtained in steps S108 and S109 with an ASCII code. The CPU 102 completes one block of an ASCII code sequence as the header information by arranging the obtained ASCII codes in accordance with the header format for the "memory transmission mode".

Next, in step S113, the CPU 102 transfers the header information formed in step S112 and the image data read by the reading unit 108 and stored in the DRAM 105 to the communication control unit 111 via the parallel i/fs 110 and 121. Although the CPU 102 transfers the header information of the nth page and the image data of the nth page as a pair, the transfer order is not particularly limited.

As described above, the CPU 102 forms the header information of the nth page in step S112 and transfers the header information to the communication control unit 111 in step S113. If data of the (n+1)th page exists in step S114 after that, the flow returns to step S111, and the CPU 102 forms the header information of the (n+1)th page. The CPU 102 can also simultaneously perform the process (S113) of transferring the nth page to the communication control unit 111 and the process (S112) of forming the header information of the (n+1)th page.

In step S114, if no next original page whose header information is to be formed exists, i.e., if the CPU 102 completely forms the header information of all pages and transfers the header information to the communication control unit 111, the CPU 102 completes the header transmission process of the main unit 101.

In the embodiment, the processes in the "direct transmission mode" and the "memory transmission mode" are explained as different processes. However, the common steps (e.g., S103 and S110, S104 and S111, a part of S105 and a part of S112, S106 and S113, and S107 and S114) of these processes can also be executed by similar process programs or modules.

The process of the CPU 112 in the communication control unit 111 will be described next. In step S201 of FIG. 19, the CPU 112 receives the facsimile transmission instruction from the main unit 101 via the parallel i/f 121. The flow advances to step S202, and the CPU 112 performs a calling operation for facsimile transmission from the ISDN interface 119 to the ISDN line 120 and connects the call to a facsimile terminal on the receiving side. The facsimile number of the receiving facsimile terminal and the like required to perform this calling operation are transferred from the main unit 101. In step S202, the CPU 112 also determines the resolution and coding system of transmission image data following a facsimile preprocedure with the receiving facsimile terminal.

In step S203, the CPU 112 sets 0 in the arbitrary parameter n indicating the page number to be currently processed. In step S204 and subsequent steps, the CPU 112 processes the data in units of pages. First, in step S204, the CPU 102 sets 1 in n by n=n+1 in order to process the first page.

In step S205, the CPU 112 receives the header information and image data of the first page from the main unit 101 via the parallel i/f 121. In step S206, the CPU 112 reads out font data corresponding to the header information from the ROM 113. The CPU 112 temporarily stores the header information and image data received from the main unit 101 and the font data read out from the ROM 113 into the DRAM 114 in order to facilitate the process. In steps S207, S208, S209, S210, and S211, the CPU 112 performs necessary resolution conversion/coding conversion for the header information and image data and synthesizes them.

First, in step S207, the CPU 112 checks whether the coding system of the image data transferred from the main unit 101 is raw or MMR coding. If the coding system is MMR coding, the flow advances to step S208, and the CPU 112 decodes the image data to obtain raw image data. This process is performed to facilitate synthesizing header data in one page because MMR coding performs coding in units of pages.

In step S209, the CPU 112 connects the header data as raw data to the head of the image data as raw data to synthesize the two data. In step S210, the CPU 112 performs necessary resolution conversion for the image data obtained by the synthesis of the header data and the image data. Assume that the header data as font data is a raw image and the resolution is 8 pels×7.7 pels. The resolution of the image data changes depanding on the arrangement of the main unit 101. In this embodiment, however, it is assumed that the resolution is a fine mode of 8 pels×7.7 pels. Also, the receiving facsimile terminal and the resolution and coding system of the transmission image data are determined by the facsimile preprocedure in step S202. If this determination result differs from the current header data, image data resolution, and coding system, the CPU 112 performs necessary conversion in accordance with the determination result.

More specifically, if the determination result indicates 8 pels×7.7 pels (fine mode), no conversion is necessary. However, if the determination result indicates 8 pels×3.85 pels (standard mode), both of the header data and image data need to be converted. Therefore, the CPU 112 performs a data thinning process.

Next, in step S211, the CPU 112 converts the image data in accordance with the coding system (e.g., MH, MR, or MMR) determined in step S202 to obtain final image data. In step S212, the CPU 112 facsimile-transmits the final image data from the ISDN interface 119 to the ISDN line 120.

As described above, the CPU 112 obtains the final image data of the nth page until step S211 and starts the facsimile transmission process in step S212. If data of the (n+1)th page exists in step S213 after that, the flow returns to step S204, and the CPU 112 forms the header data of the (n+1)th page, synthesizes the header data to the image data, and converts the data. The CPU 112 can also simultaneously perform the process (S212) of facsimile-transmitting the nth page and the processes (S205 to S211) of forming, synthesizing, and converting the header data of the (n+1)th page.

In step S213, if no next original page to be transmitted exists, i.e., if the CPU 112 completely forms the header data of all pages, synthesizes the header data to the image data, and converts the resolution and coding system, the CPU 112 completes this process of the communication control unit 111. When the CPU 112 completes the facsimile transmission of all pages, the CPU 112 performs a facsimile postprocedure to complete the whole procedure of the facsimile transmission.

If the image data transferred from the main unit 101 to the communication control unit 111 is encoded by MH or MR as a facsimile coding system different from MMR, the data amount may be larger than in the mm coding system in accordance with the type of image. In step S208, however, the header data and the image data can be synthesized without being decoded. This decreases the process amount in the communication control unit 111.

More specifically, if the image data coding system is MH or MR, the coded image data can be directly recognized in units of one or two lines because MH or MR performs coding for one or two lines. That is, the header image data of one or two lines as the header is deleted as the data is kept coded, and the coded header data is synthesized.

Furthermore, if it is determined in step S202 that the coding system of the receiving facsimile terminal is MH or MR, the communication control unit 111 does not need to convert the coding system of the transmission data. Accordingly, the header data can be synthesized to the transmission data only by converting the coding system of the header data into the same coding system as the transmission data. In this manner, the final transmission data can be formed.

In one modification of this embodiment, the communication control unit connects to the receiving terminal after receiving the header information and determines the data format of data transmission in cooperation with the receiving terminal. After that, the communication control unit converts and transmits the header information together with the transmission data. This modification does not require any high-speed processing capability and can be realized by small-scale control processes.

Another embodiment of the facsimile apparatus will be described below.

Figure 21:
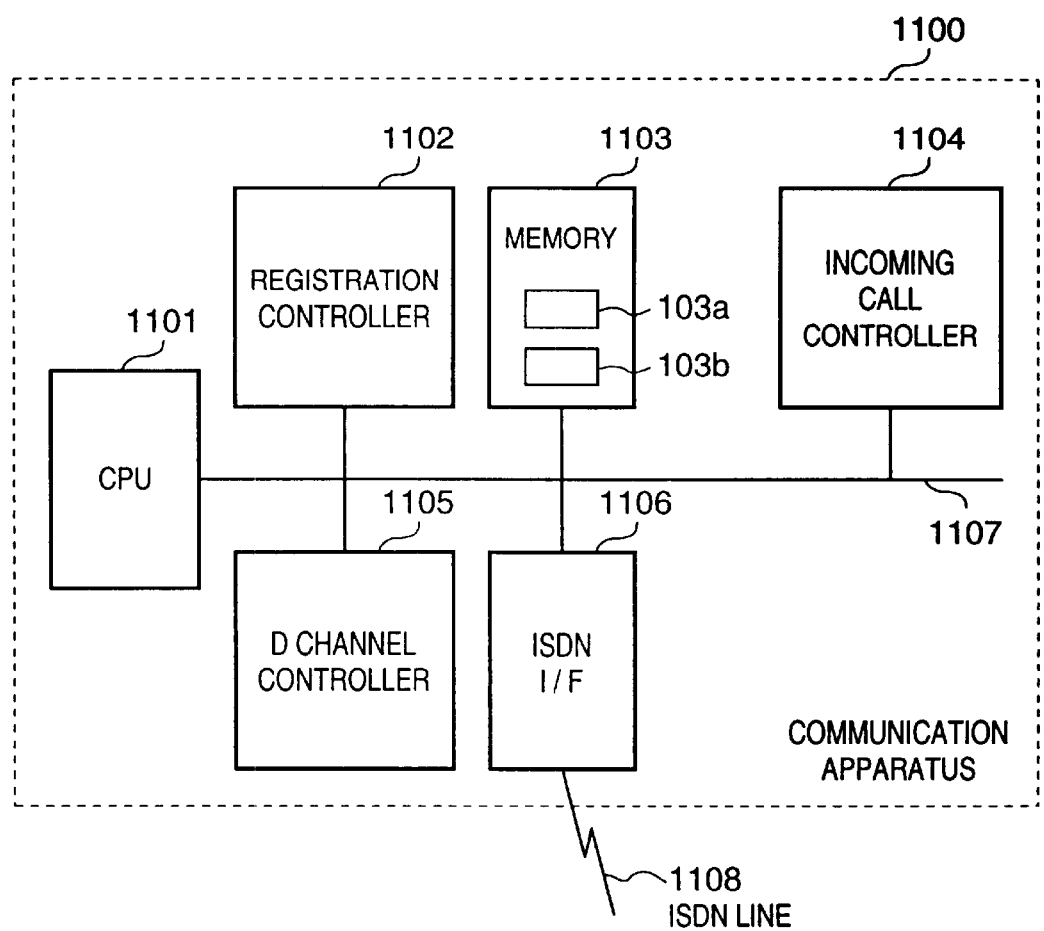
FIG. 21 is a block diagram showing another embodiment of the communication apparatus according to the present invention.

As shown in FIG. 21, a communication apparatus 1100 comprises a CPU 1101 for controlling the whole apparatus, i.e., performing system control. The CPU 1101 is connected through a system bus 1107 to a registration controller 1102, a memory 1103, an incoming call controller 1104, a D channel controller 1105, and an ISDN I/F 1106 for electrically interfacing with an ISDN line 1108.

The registration controller 1102 performs registration control for registering various registration setting contents input by a user into the memory 1103. For example, the telephone number of the self-apparatus, settings for rejecting an incoming call (sending a release completion message; REL COMP) or ignoring an incoming call (not responding to an incoming call) when call reception is impossible (to be described later), and other setting modes are registered in the memory 1103. In FIG. 21, the setting for rejecting or ignoring an incoming call when the registered telephone number of the self-terminal and the called party number disagree is registered in an area 1103a of the memory 1103. The setting for rejecting or ignoring an incoming call when the registered telephone number of the self-terminal and the called party number agree and call reception is impossible due to the state of the apparatus is registered in an area 1103b of the memory 1103. The memory 1103 also stores apparatus management data and image data in addition to the registered contents.

When an incoming call arrives from the ISDN line 1108, the incoming call controller 1104 detects the contents registered in the memory 1103 and the free space in the memory 1103. On the basis of the detection results, the incoming call controller 1104 makes a judgement on whether call reception is possible. More specifically, the incoming call controller 1104 detects called party number information from an incoming call message from the ISDN line 1108 and detects the state of the apparatus (e.g., the free space in the memory 1103 and the presence/absence of sheets, toner, and ink in a printing unit 109). The incoming call controller 1104 makes a judgement in accordance with the apparatus state detected together with whether the telephone number of the self-terminal and the called party number information agree. on the basis of these judgement conditions, the incoming call controller 1104 makes a judgement on whether call reception is possible, call reception is impossible due to the apparatus state, or call reception is impossible because the registered telephone number of the self-terminal and the called party number information disagree. If the incoming call controller 1104 judges that call reception is possible, the incoming call controller 1104 sends an incoming call response message to the ISDN line 1108. If the incoming call controller 1104 judges that call reception is impossible, the incoming call controller 1104 sends an incoming call rejection message to the ISDN line 1108 or ignores the incoming call in accordance with the set contents of the memory 1103. This procedure of the incoming call controller 1104 is the same as in FIG. 11.

The D channel controller 1105 controls a D-channel communication protocol as call control for the ISDN line 1108 and sends the incoming call response message or the incoming call rejection message (REL COMP message) to the ISDN line 1108 in accordance with the instruction from the incoming call controller 1104. This message sending procedure of the D channel controller 1105 is the same as in FIG. 10.

Figure 22:
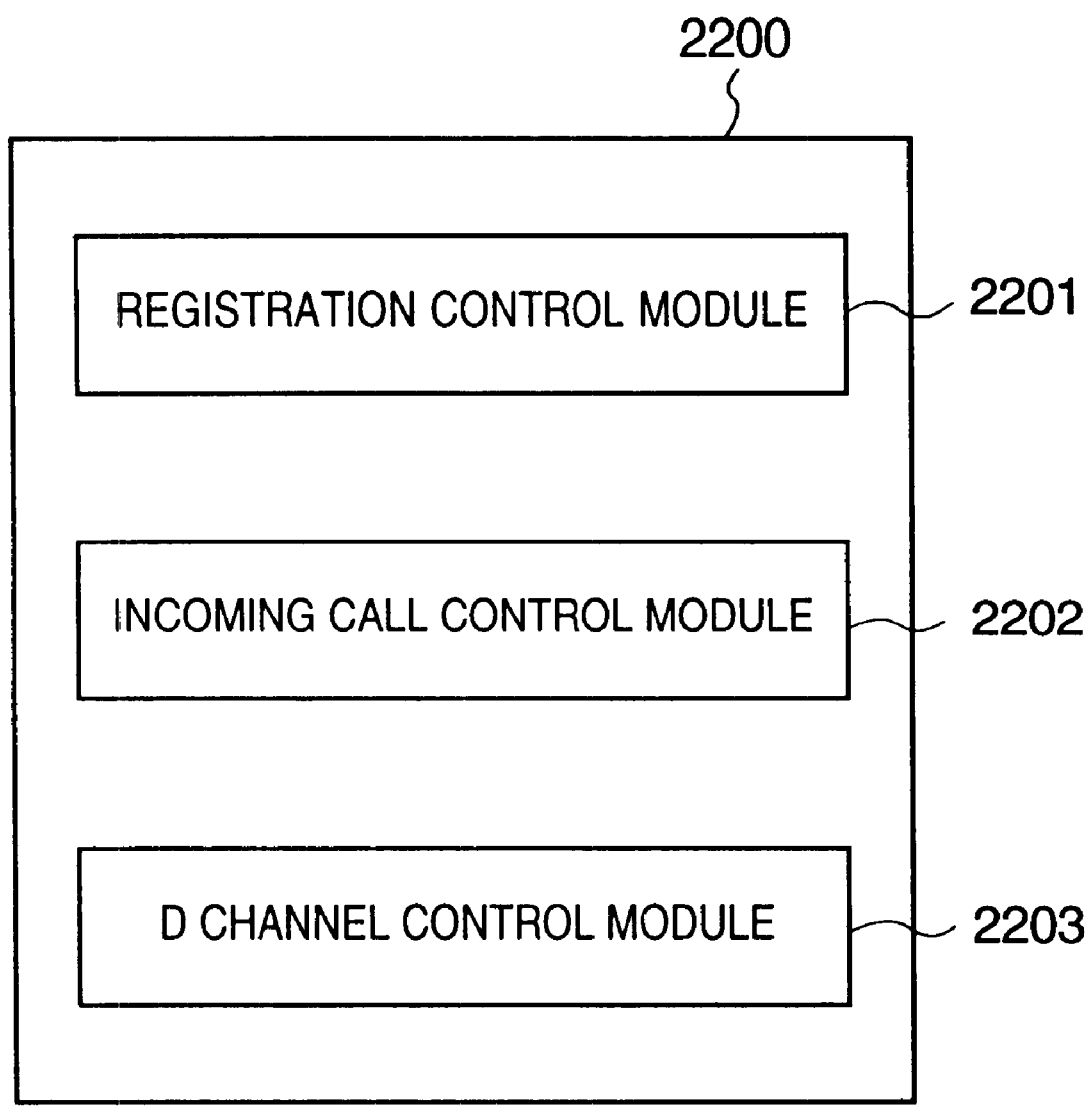
FIG. 22 is a view showing programs for constructing blocks of a registration controller, an incoming call controller, and a D channel controller in the communication apparatus.

The blocks of the registration controller 1102, the incoming call controller 1104, and the D channel controller 1105 can also be constructed by reading out and executing programs stored in a storage medium such as a ROM or an HDD (Hard Disk Drive) by the CPU 1101. The arrangement of the programs stored in the storage medium will be described below with reference to FIG. 22. FIG. 22 is a view showing the program arrangement for constructing the blocks of the register controller, incoming call controller, and D channel controller in the communication apparatus shown in FIG. 21.

As shown in FIG. 22, the programs for constructing the blocks of the registration controller 1102, the incoming call controller 1104, and the D channel controller 1105 have a registration control module 2201 for constructing the registration controller 1102, an incoming call control module 2202 for constructing the incoming call controller 1104, and a D channel control module 2203 for constructing the D channel controller 1105, respectively. The processes executed by these modules are identical with the processes performed by the corresponding blocks, and a detailed description thereof will be omitted.

The present invention can be applied to a system constituted by a plurality of devices (e.g., host computer, interface, reader, printer) or to an apparatus (e.g., copying machine, facsimile) comprising a single device.

Further, the object of the present invention can also be achieved by providing a storage medium storing program codes for performing the aforesaid functions according to the embodiments to a system or an apparatus, reading the program codes with a computer (e.g., CPU, MPU) of the system or apparatus from the storage medium, and then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire process in accordance with designations of the program codes and realizes functions according to the above embodiments.

Furthermore, the present invention also includes a case where, after the program codes read from the storage medium are written in a function extension board which is inserted into the computer or in a memory provided in a function extension unit which is connected to the computer, CPU or the like contained in the function extension board or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus including a main unit and a communication control unit, wherein said communication control unit informs said main unit of an incoming call from a communication line, said main unit includes setting means for setting data for indicating that the incoming call should be rejected or ignored in accordance with a state of receiving means for receiving data from a calling side, selects whether the incoming call should be rejected or ignored in accordance with the set data and the state of the receiving means, and instructs said communication control unit to reject the incoming call in accordance with the selection, and said communication control unit transmits a call rejection signal to the communication line in a case where said communication control unit is instructed to reject the incoming call.

2. The apparatus according to claim 1, wherein said main unit selects in accordance with a state of a memory for storing reception data.

3. The apparatus according to claim 1, wherein said main unit selects in accordance with a state of a recording unit for recording received data.

4. The apparatus according to claim 1, wherein said main unit selects in accordance with data included in an incoming call signal.

5. The apparatus according to claim 1, wherein said main unit selects in accordance with a calling party number.

6. The apparatus according to claim 1, wherein said main unit selects in accordance with a called party number.

7. The apparatus according to claim 1, wherein said main unit and said communication control unit are connected via a general-purpose interface.

8. The apparatus according to claim 1, wherein said main unit and the said communication control unit are connected via a Bi-Centronics interface.

9. The apparatus according to claim 1, wherein said communication control unit controls G4 and/or G3 facsimile communication.

10. The apparatus according to claim 1, wherein said main unit includes a first CPU and a first memory for storing a first program for the first CPU, and said communication control unit includes a second CPU and a second memory for storing a second program for the second CPU.

11. The apparatus according to claim 1, wherein the setting means sets the data for indicating that the incoming call should be rejected or ignored in accordance with data included in an incoming call signal.

12. The apparatus according to claim 1, wherein said main unit includes a memory for storing first data for indicating that the incoming call should be rejected or ignored in accordance with data included in an incoming call signal, and second data for indicating that the incoming call should be rejected or ignored in accordance with the state of the receiving means.

13. The apparatus according to claim 1, wherein said main unit makes a first judgment on whether the incoming call should be accepted, rejected or ignored in accordance with data included in an incoming call signal, and makes a second judgment on whether the incoming call should be accepted, rejected or ignored in accordance with the state of the receiving means.

14. The apparatus according to claim 13, wherein said main unit instructs said communication control unit to accept, reject or ignore the incoming call dependent upon the second judgment in a case where it is judged in the first judgment that the incoming call should be accepted, and to reject or ignore the incoming call dependent upon the first judgment and independent from the second judgment in a case where it is judged in the first judgment that the incoming call should be rejected or ignored.

15. The apparatus according to claim 1, wherein said main unit generates additional information, and sends the additional information and transmission data to said communication control unit, and said communication control unit transmits the additional information and the transmission data.

16. A method of responding to an incoming call in a communication apparatus that includes a main unit and a communication control unit, comprising the steps of:

storing setting data indicating whether the incoming call should be rejected or ignored in accordance with data included in an incoming call signal from a communication line;

informing the main unit of the incoming call detected by the communication control unit;

selecting in the main unit whether the incoming call should be rejected or ignored in accordance with the data included in the incoming call signal and the setting data stored in said storing step; and instructing the communication control unit to reject the incoming call in accordance with the selection made in the main unit, wherein the communication control unit transmits a call rejection signal to the communication line in a case where the communication control unit is instructed to reject the incoming call.

17. The method according to claim 16, wherein the data included in the incoming call signal is a called party number.

18. A communication apparatus including a main unit and a communication control unit, wherein said communication control unit informs said main unit of an incoming call, said main unit includes setting means for setting data for indicating that the incoming call should be rejected or ignored in accordance with data included in an incoming call signal from a communication line, selects whether the incoming call should be rejected or ignored in accordance with the set data and the data included in the incoming call signal, and instructs said communication control unit to reject the incoming call in accordance with the selection, and said communication control unit transmits a call rejection signal to the communication line in a case where said communication control unit is instructed to reject the incoming call.

19. The apparatus according to claim 18, wherein the data included in the incoming call signal is a called party number.

20. A method of responding to an incoming call in a communication apparatus that includes a main unit and a communication control unit, comprising the steps of:

storing setting data indicating whether the incoming call should be rejected or ignored in accordance with a state of receiving means for receiving data from a calling side;

informing the main unit of the incoming call, from a communication line, detected by the communication control unit;

selecting in the main unit whether the incoming call should be rejected or ignored in accordance with the state of the receiving means and the setting data stored in said storing step; and instructing the communication control unit to reject the incoming call in accordance with the selection made in the main unit, wherein the communication control unit transmits a call rejection signal to the communication line in a case where the communication control unit is instructed to reject the incoming call.

21. The method according to claim 20, wherein the receiving means includes memory means for storing data from the calling side.

* * * * *

UNITED STATES PATENT AND TRADEMARK OFFICE
CERTIFICATE OF CORRECTION

PATENT NO. : 6,442,252 B1
DATED : August 27, 2002
INVENTOR(S) : Shunichi Fujise et al.

It is certified that error appears in the above-identified patent and that said Letters Patent is hereby corrected as shown below:

<u>Title page,</u>
Insert: -- [*] Notice    This patent issued on a continued prosecution application filed under 37 CFR 1.53(d), and is subject to the twenty year patent term provisions of 35 U.S.C. 154(a)(2). --.

<u>Drawings,</u>
Sheet 4, Figure 5, "IN MAIN UNIT" should read -- IS MAIN UNIT --.

<u>Column 6,</u>
Line 59, "t he" should read -- the --.
Line 67, "the this" should read -- this --.

<u>Column 8,</u>
Line 40, "SPAM 104." should read -- SRAM 104. --.

<u>Column 11,</u>
Line 30, "unit 11" should read -- unit 111 --.

<u>Column 13,</u>
Line 39, "G4facsimile" should read -- G4 facsimile --.

<u>Column 15,</u>
Line 53, "1728+16=108 characters" should read -- 1728÷16=108 characters --.

<u>Column 16,</u>
Line 16, "(S1O6)" should read -- (S106) --.
Line 36, "step S101," should read -- step S110, --.

<u>Column 18,</u>
Line 47, "mm coding system" should read -- MMR coding system --.

UNITED STATES PATENT AND TRADEMARK OFFICE
CERTIFICATE OF CORRECTION

PATENT NO. : 6,442,252 B1
DATED : August 27, 2002
INVENTOR(S) : Shunichi Fujise et al.

It is certified that error appears in the above-identified patent and that said Letters Patent is hereby corrected as shown below:

Column 19,
Line 49, "on" should read -- On --.

Column 20,
Line 47, "are" should read -- being --.

Signed and Sealed this

Eleventh Day of February, 2003

JAMES E. ROGAN
*Director of the United States Patent and Trademark Office*